United States Patent
Kiyotoshi

(10) Patent No.: US 7,336,428 B2
(45) Date of Patent: Feb. 26, 2008

(54) ZOOM LENS SYSTEM AND ELECTRONIC IMAGE PICKUP APPARATUS USING THE SAME

(75) Inventor: Maya Kiyotoshi, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/406,297

(22) Filed: Apr. 19, 2006

(65) Prior Publication Data
US 2006/0262423 A1   Nov. 23, 2006

(30) Foreign Application Priority Data
Apr. 19, 2005 (JP) ............................. 2005-120742
Jun. 9, 2005 (JP) ............................. 2005-169049

(51) Int. Cl.
*G02B 15/14* (2006.01)

(52) U.S. Cl. ...................... 359/689; 359/680; 359/676

(58) Field of Classification Search ................ 359/676, 359/686, 689; 859/680
See application file for complete search history.

(56) References Cited

U.S. PATENT DOCUMENTS

| 5,721,642 | A  | * | 2/1998 | Shibayama et al. | ......... 359/686 |
| 6,304,389 | B1 |   | 10/2001 | Shibayama |   |
| 6,545,817 | B2 | * | 4/2003 | Hirose | ........................ 359/683 |
| 2004/0201902 | A1 |   | 10/2004 | Mihara et al. |   |
| 2006/0056054 | A1 | * | 3/2006 | Kashiki | ...................... 359/689 |

FOREIGN PATENT DOCUMENTS

JP        2004-191599 A    7/2004

* cited by examiner

*Primary Examiner*—Scott J. Sugarman
*Assistant Examiner*—Darryl J. Collins
(74) *Attorney, Agent, or Firm*—Kenyon & Kenyon LLP

(57) ABSTRACT

A zoom lens system has a first lens unit having a negative refractive power, a second lens unit having a positive refractive power, and a third lens unit having a positive refractive power in order to from an object side, spaces between the respective lens units change during zooming, and the zoom lens system satisfies predetermined conditions.

44 Claims, 12 Drawing Sheets

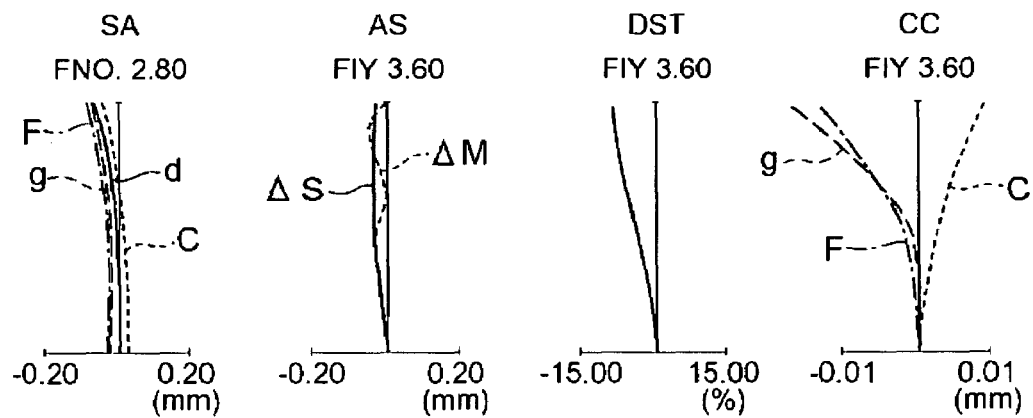
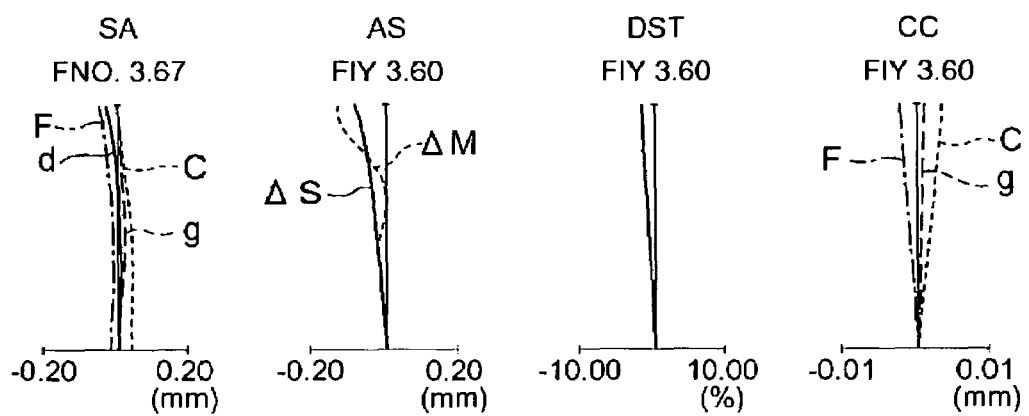
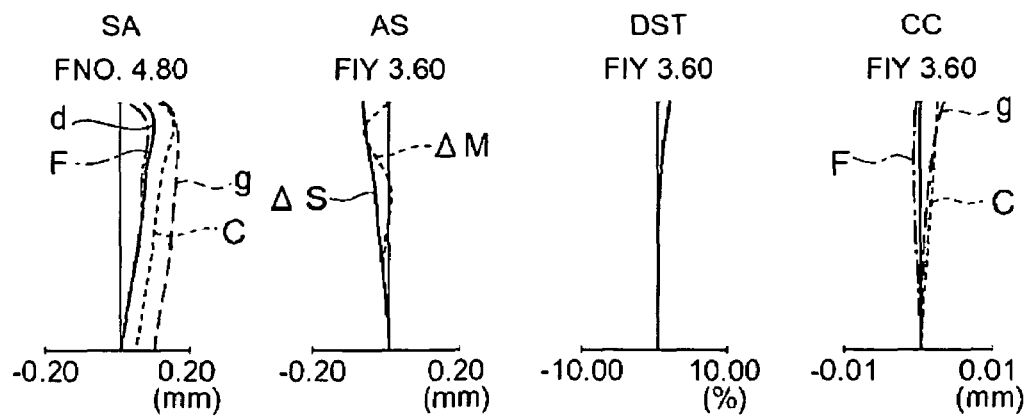

ZOOM LENS SYSTEM AND ELECTRONIC IMAGE PICKUP APPARATUS USING THE SAME

CROSS REFERENCE TO RELATED APPLICATION

This application claims benefit under 35 U.S.C. §119 of Japanese Patent Applications of No. 2005-120,742, filed in Japan on Apr. 19, 2005 and No. 2005-169,049, filed in Japan on Jun. 9, 2005, the contents of which are incorporated herein by reference.

BACKGROUND OF THE INVENTION

1. Field of the Invention

The present invention relates to a zoom lens system and an electronic image pickup apparatus using the same.

2. Description of the Related Art

A zoom lens system to be applied to an electronic image pickup apparatus such as a digital camera is demanded to have a wide photographing angle of view and a high image forming performance. It is also demanded that a digital zoom function of the image pickup apparatus be combined to enlarge an image of an object very largely. In this case, since the digital zoom function enlarges an only part of an image picked up by an image sensor disposed in the electronic image pickup apparatus by electric processing, an image tends to become coarse. To prevent this, the zoom lens system is demanded to have a certain degree of zooming ratio.

Therefore, the zoom lens system for use in the electronic image pickup apparatus is demanded to have a high image forming performance, a large angle of view in a wide angle end, and a certain degree of or more zooming ratio.

As a compact photographing zoom lens system whose zooming ratio exceeds three-fold and whose angle of view is comparatively large, there is known a lens system described in Japanese Patent Application Laid-Open Nos. 2004-191599 and 2001-42218 and U.S. Patent Application Publication No. 2004/0201902A1.

BRIEF SUMMARY OF THE INVENTION

In an aspect of the present invention, there is provided a zoom lens system which comprises, in order from an object side: a first lens unit having a negative refractive power; a second lens unit having a positive refractive power; and a third lens unit having a positive refractive power, spaces between the respective lens units being changed during zooming, the zoom lens system satisfying the following conditions (1A) through (4A):

$$0.80 < IH/fw < 1.5 \quad (1A);$$

$$2.7 < ft/fw < 12 \quad (2A);$$

$$0.05 < |da/f1G| < 10 \quad (3A); \text{ and}$$

$$0 < db/f2G < 3 \quad (4A),$$

wherein IH is an image height of the zoom lens system,
fw is a focal length in a wide angle end of the zoom lens system,
ft is a focal length in a telephoto end of the zoom lens system,
f1G is a focal length of the first lens unit,
f2G is a focal length of the second lens unit,
da is an axial space between the first lens unit and the second lens unit at a time when a focal length fra of the zoom lens system has any value that satisfies the following condition (a), and
db is an axial space between the first lens unit and the second lens unit at a time when a focal length frb of the zoom lens system has any value that satisfies the following condition (b):

$$IH/0.92 < fra < IH/0.8 \quad (a); \text{ and}$$

$$2.7 < frb/fra < 5 \quad (b).$$

In another aspect of the present invention, there is provided a zoom lens system which comprises, in order from an object side: a first lens unit having a negative refractive power; a second lens unit having a positive refractive power; and a third lens unit having a positive refractive power, zooming in excess of two-fold being performed by changing spaces between the respective lens units, the zoom lens system satisfying the following condition (1B),
wherein the first lens unit includes: a negative lens L11 in which an absolute value of a curvature of an image-side surface is larger than that of a curvature of an object-side surface; and two lenses L12, L13 arranged on the image side of the negative lens L11, and
the only lenses L11, L12, and L13 among the lenses included in the first lens unit satisfy the following condition (4B), and further satisfy the following conditions (2B), (3B) and (5B):

$$0.76 < IH/fw < 1.5 \quad (1B);$$

$$0.05 < |da/f1G| < 10 \quad (2B);$$

$$IH/HB1 < 0.5 \quad (3B);$$

$$0.5 < dx/d11 < 4 \quad (4B); \text{ and}$$

$$0.80 < (d11+d12+d13)/d\text{total} \leq 1.00 \quad (5B),$$

wherein IH is an image height of the zoom lens system,
fw is a focal length in a wide angle end of the zoom lens system,
f1G is a focal length of the first lens unit,
HB1 is a distance from a vertex of an image-side lens surface to a rear principal point of the first lens unit, and is regarded as a positive value when measured in a direction toward the object side,
d11 is an axial thickness of the negative lens L11,
d12 is an axial thickness of the lens L12,
d13 is an axial thickness of the lens L13,
dx is an axial thickness of a lens L1x (x=1, 2, . . . ) in the first lens unit,
dtotal is a sum of axial thicknesses of the lenses in the first lens unit; and
da is an axial space between the first lens unit and the second lens unit at a time when a focal length fra of the zoom lens system has any value that satisfies the following condition (c):

$$IH/0.92 < fra < IH/0.76 \quad (c).$$

In the present invention, an electronic image pickup apparatus comprises: a zoom lens system; and an electronic image sensor which is disposed on an image side of the zoom lens system and which converts an optical image into an electric signal, and the zoom lens system of the present invention is used as the zoom lens system.

The zoom lens system of the present invention is broadly applicable to an electronic image pickup apparatus such as a lens integrated type digital camera, a lens changeable type digital camera, or a monitor camera.

Other features and advantages of the present invention will become apparent from the following detailed description, examples, drawing figures and appended claims.

BRIEF DESCRIPTION OF THE DRAWINGS

FIG. 1A shows a state in a wide angle end, FIG. 1B shows an intermediate focal length state, and FIG. 1C shows a state in a telephoto end;

FIG. 2A shows a state in a wide angle end, FIG. 2B shows an intermediate focal length state, and FIG. 2C shows a state in a telephoto end;

FIG. 3A shows a state in a wide angle end, FIG. 3B shows an intermediate focal length state, and FIG. 3C shows a state in a telephoto end;

FIG. 4A shows a state in a wide angle end, FIG. 4B shows an intermediate focal length state, and FIG. 4C shows a state in a telephoto end;

FIG. 5A shows a state in a wide angle end, FIG. 5B shows an intermediate focal length state, and FIG. 5C shows a state in a telephoto end (c);

FIG. 6A shows a state in a wide angle end, FIG. 6B shows an intermediate focal length state, and FIG. 6C shows a state in a telephoto end;

FIG. 7A shows a state in a wide angle end, FIG. 7B shows an intermediate focal length state, and FIG. 7C shows a state in a telephoto end;

FIG. 8A shows a state in a wide angle end, FIG. 8B shows an intermediate focal length state, and FIG. 8C shows a state in a telephoto end;

FIGS. 9A to 9C show spherical aberration, astigmatism, distortion, and chromatic aberration of magnification of Example 4, FIG. 9A shows a state in a wide angle end, FIG. 9B shows an intermediate focal length state, and FIG. 9C shows a state in a telephoto end;

FIG. 10A shows a state in a wide angle end, FIG. 10B shows an intermediate focal length state, and FIG. 10C shows a state in a telephoto end;

DETAILED DESCRIPTION OF THE PREFERRED EMBODIMENTS

Figure 1A:
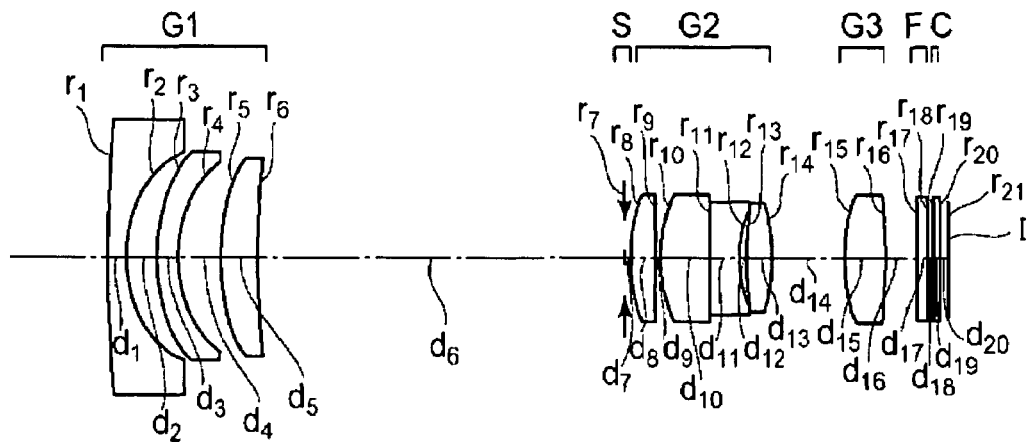
FIGS. 1A to 1C are sectional views of a zoom lens system of Example 1 of the present invention including an optical axis at a time when the lens is focused on an infinite object.
Figure 1B:
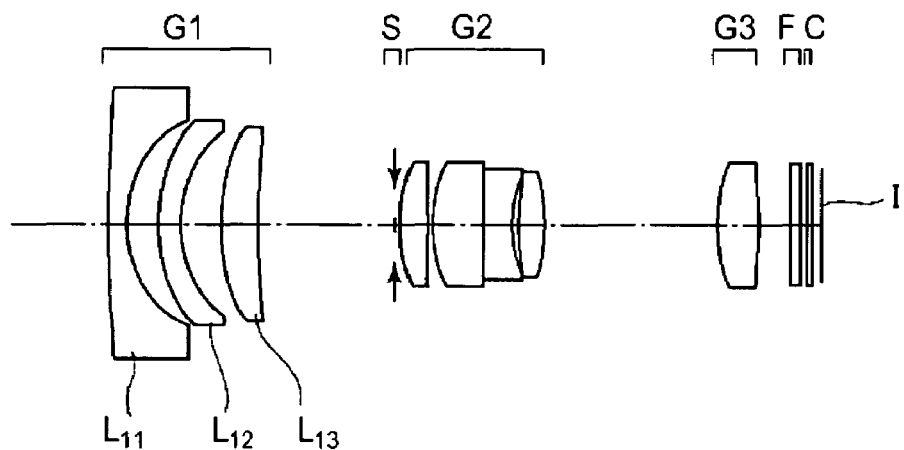
Figure 1C:
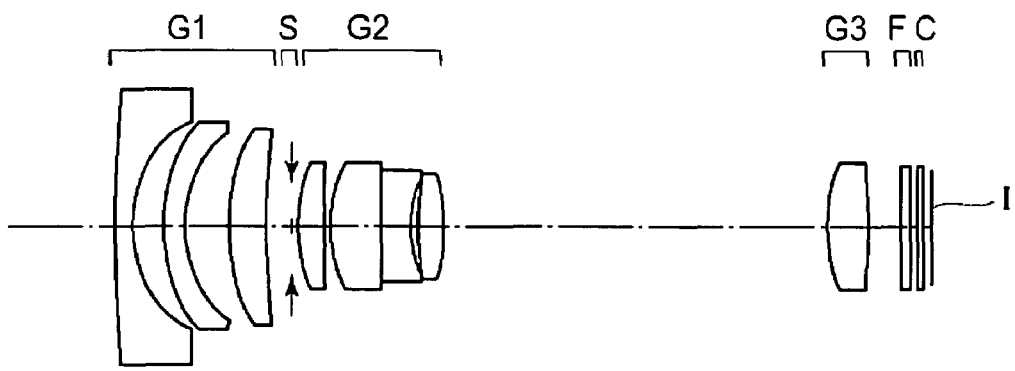

As described above, in an aspect of the present invention, the zoom lens system comprises, in order from an object side: a first lens unit having a negative refractive power; a second lens unit having a positive refractive power; and a third lens unit having a positive refractive power, spaces between the respective lens units are changed during zooming, and the zoom lens system satisfies the following conditions (1A) to (4A):

$$0.80 < IH/fw < 1.5 \quad (1A);$$

$$2.7 < ft/fw < 12 \quad (2A);$$

$$0.05 < |da/f1G| < 10 \quad (3A); \text{ and}$$

$$0 < db/f2G < 3 \quad (4A),$$

wherein IH is an image height of the zoom lens system, fw is a focal length in a wide angle end of the zoom lens system, f1G is a focal length of the first lens unit, f2G is a focal length of the second lens unit, da is a space between the first lens unit and the second lens unit measured on an optical axis at a time when a focal length fra of the zoom lens system has any value that satisfies the following condition (a), and db is a space between the first lens unit and the second lens unit measured on an optical axis at a time when a focal length frb of the zoom lens system has any value that satisfies the following condition (b):

$$IH/0.92 < fra < IH/0.8 \quad (a); \text{ and}$$

$$2.7 < frb/fra < 5 \quad (b).$$

Since the zoom lens system includes the first lens unit having the negative refractive power and the second lens unit having the positive refractive power which is disposed on the image side of the first lens unit with a variable space from the first lens unit, a light flux entering at a large angle of view is refracted with the negative refractive power, and introduced into the second lens unit having the positive refractive power.

Therefore, even in a case where the focal length of the zoom lens system in the wide angle end is set so as to satisfy the condition (1A) in order to secure a large angle of view in the wide angle end, it is possible to reduce the outer diameter of the first lens unit. The reducing of the outer diameter of the first lens unit is advantageous in reducing the length of the first lens unit or strengthening the power of the first lens unit.

Moreover, when the third lens unit having the positive refractive power is disposed on the image side of the second lens unit having the positive refractive power, it is possible to reduce the change of the incidence angle of the light flux onto the image surface while satisfying the zooming ratio defined by the condition (2A).

Especially in a case where an electronic image sensor to convert an optical image into an electric signal is disposed on the image side of the zoom lens system, since the telecentricity can be secured in the zoom lens system of the present invention, it is possible to reduce an adverse influence obtained at a time when a ray obliquely enters the image sensor.

Below the lower limit of 0.80 of the condition (1A), the photographing area becomes narrow, and the photographing area cannot be covered even by image processing. On the other hand, above the upper limit of 1.5 of the condition (1A), the refractive power of the whole zoom lens system becomes excessively strong. Therefore, it is difficult to correct aberration of each lens unit during zooming if the zooming ratio satisfying the condition (2A) is to be secured.

Above the upper limit of 12 of the condition (2A), a load of the refractive power shared by the first lens unit having the negative refractive power is increased, and it is difficult to secure compactness while correcting aberration changes. Below the lower limit of 2.7 of the condition (2A), a large degree of improvement in the compactness is not seen, but the image quality is unfavorably largely deteriorated, for example, at a time when a distant object is photographed in a large size by utilizing the digital zooming, or trimming is performed after the photographing.

Moreover, when the upper limit of the condition (2A) is exceeded, the movement amount of the second lens unit easily becomes large, and the compactness is impaired.

The condition (3A) defines the relation between the refractive power of the first lens unit and the space between the first lens unit and the second lens unit in the state that the zoom lens system has an arbitrary focal length fra which satisfies the condition (a).

Below the lower limit of 0.05 of the condition (3A), the power of the first lens unit becomes excessively weak, and the total length of the zoom lens system in the telephoto end increases. On the other hand, above the upper limit of 10 of the condition (3A), the space between the first lens unit and the second lens unit becomes excessively large, and this goes against miniaturization.

The condition (4A) defines the relation between the refractive power of the second lens unit and the space between the first lens unit and the second lens unit in the state that the zoom lens system has an arbitrary focal length frb which satisfies the condition (b).

Below the lower limit of 0 of the condition (4A), the first lens unit interferes with the second lens unit. Above the upper limit of 3 of the condition (4A), the constitution of and after the second lens unit becomes complex. For example, the power of the second lens unit becomes strong.

It is to be noted that in the condition (1A), when the lower limit may be set to preferably 0.85, more preferably 0.87 for broadening the photographing area. The upper limit may be set to preferably 1.3, more preferably 1.1 in order to reduce the aberration of each lens unit more easily.

As to the condition (2A), the lower limit may be set to 3.5, more preferably 4.0 in order to improve the image quality in photographing a distant object. To obtain a compacter zoom lens system, the upper limit may be set to preferably 7.0, more preferably 6.0.

As to the condition (3A), the lower limit may be set to preferably 1.0, more preferably 1.0 in order to reduce the total length of the zoom lens system. The upper limit may be set to preferably 7.0, more preferably 5.0.

As to the condition (4A), the upper limit may be set to preferably 1.0, more preferably 0.2, so that the constitution of and after the second lens unit becomes simpler.

Moreover, an aperture stop is preferably disposed in a position on the image side of the first lens unit and on the object side of the lens closest to the image side in the second lens unit in order to inhibit enlargement of the outer diameter of the first lens unit, to reduce an emission angle of the ray from the zoom lens system, and to correct the aberration of the whole zoom lens system more easily.

Furthermore, fra=fw, frb=ft may be set. In this case, the condition (1A) is replaced with the condition (a), and the condition (2A) is replaced with the condition (b).

In addition, the zoom lens system may be constituted to satisfy the following condition (5A);

$$-0.07 < IH/r1 < 0.07 \quad (5A),$$

wherein r1 is a paraxial radius of curvature of the lens surface closest to the object side in the first lens unit.

The zoom lens system may be constituted to satisfy the following condition (5A') instead of the condition (5A):

$$-0.015 < IH/r1 < 0.04 \quad (5A').$$

When increasing the paraxial radius of curvature of the lens surface (first surface) closest to the object side in the first lens unit, the entrance pupil can be disposed in a shallow position. Therefore, it is possible to reduce an outer diameter of the lens. A difference between angles formed by the rays constituting an off-axial light flux and a first surface is reduced, and this is advantageous for correcting coma. In addition, the photographing area can be broadened while maintaining the image forming performance. Since the diameter of the axial light flux during zooming largely changes on the first surface, and the curvature in the vicinity of the optical axis of the first surface is small, the change of the spherical aberration during zooming can be reduced, and a burden imposed on the second lens unit for the correction of aberration can be preferably reduced.

Below the lower limit of −0.07 of the condition (5A), the incidence angle of the off-axial light flux onto the first surface increases, and it is difficult to maintain the image forming performance. Above the upper limit of 0.07, the position of the entrance pupil cannot be shallow. Therefore, the outer diameter of the lens increases, and the compactness is impaired. Moreover, the lens constitution of the first lens unit for securing the angle of view has to be complicated. Further, the correction of coma is adversely affected. Therefore, the constitution of the whole zoom lens system unfavorably becomes complicated. Alternatively, the angle of view has to be reduced, and the photographing area has to be reduced.

In the condition (5A), the lower limit may be set to preferably −0.015, more preferably 0. The upper limit may be set to preferably 0.04, more preferably 0.033. For example, when both of the upper and lower limits of the condition (5A) are reduced to satisfy the condition (5A'), this is more advantageous in reduction of the lens outer diameter, maintenance of the image forming performance, and securement of a broad photographing area.

Furthermore, when the lens component closest to the object side in the first lens unit is constituted so as to have a concave surface on the image side, the radius of curvature of the concave surface can be prevented from being excessively small, and it is possible to correct spherical aberration and coma satisfactorily.

The zoom lens system may have an aperture stop. The zoom lens system may be constituted so that during the zooming from the wide angle end to the telephoto end, the first lens unit moves, the second lens unit moves to the object side, and the aperture stop moves together with the second lens unit.

Since the aperture stop can be moved together with the second lens unit which performs the zooming, the change of the region of the incidence light flux onto the second lens unit can be reduced. Therefore, the aberration changes accompanying the movement of the second lens unit can be suppressed.

Moreover, when the first lens unit is moved once to the image side and returned to the object side during the zooming from the wide angle end to the telephoto end, the zoom lens system can be constituted to be compact including a lens barrel structure.

The aperture stop may be disposed between the first lens unit and the second lens unit. According to such constitution, the entrance pupil can be disposed in a shallow position, and the outer diameter of the first lens unit can be reduced. An influence of eccentricity of the lens element by a manufacturing error is easily reduced in the second lens unit, and the lens barrel structure or the lens constitution can be simplified.

The zoom lens system may include, as the lens units having refractive powers, only three lens units of the first lens unit having the negative refractive power, the second lens unit having the positive refractive power, and the third lens unit having the positive refractive power, in order from an object side. That is, the zoom lens system can be constituted with only three lens units mentioned above, or can be constituted to includes another lens unit in addition to the three lens units, which has no refractive power. According to such constitution, a retrofocus system advantageous for a wide-angle lens system is constituted of small number of lens units, and it is possible to control the position of the exit pupil suitably for an electronic image sensor.

Moreover, the third lens unit is more preferably moved during the zooming, and this is more advantageous in controlling the position of the exit pupil.

The lens L11 closest to the object side in the first lens unit of the zoom lens system may be a negative meniscus lens which directs its convex surface toward the object side. According to such constitution, while the angle of view of the wide angle end is enlarged, excessive generation of negative distortions can be easily suppressed.

In the zoom lens system, the first lens unit may have, in order from an object side, a negative lens and a negative meniscus lens which is disposed on the image side of the negative lens with an axial air space from the negative lens and which directs its convex surface toward the object side. According to such constitution, since the off-axial ray can be gradually bent, the generation of the off-axial aberration can be suppressed.

The first lens unit of the zoom lens system may include a negative lens having an aspherical surface. According to such constitution, the off-axial aberration such as the curvature of field can be efficiently corrected and the lens system may be miniaturized.

The zoom lens system may be constituted so that the first lens unit includes: a negative lens; and a negative lens which is disposed on the image side of the negative lens with an air axial space from the negative lens in order from the object side, and the negative lens disposed on the image side has an aspherical surface.

The outer diameter of the negative lens on the image side is smaller than that of the negative lens on the object side, and the aspherical surface is advantageously used in the image-side negative lens in respect of a manufacturing cost. The disposing of the aspherical surface on the image-side negative lens can be effective in respect of balance with the correction of other aberrations.

The negative lens disposed on the image side of the zoom lens system may have two aspherical surfaces. According to such constitution, the effects of the aspherical surfaces can be gradually exerted on off-axial light flux, and this is preferable in correcting the aberration. Since one lens has a plurality of aspherical surfaces, the number of lenses having aspherical surfaces can be reduced. This is advantageous for manufacturing aspect such as the manufacturing cost. Specifically, the only negative lens disposed on the image side may be constituted of an aspherical lens among the lenses of the first lens unit. This constitution is more preferable in respect of the manufacturing cost.

In the zoom lens system, the first lens unit may be constituted of three lens elements of a negative lens L11, a negative lens L12, and a positive lens L13 in order from the object side. According to such constitution, since the off-axial ray can be gradually bent in two negative lenses L11 and L12, the generation of the off-axial aberration is suppressed. Furthermore, since the positive lens L13 is disposed on the image side, it is possible to correct a chromatic aberration. Since the whole first lens unit includes two negative lenses L11 and L12 and one positive lens L13, the principal point may be positioned on the object side, and the outer diameter of the lens can be compact.

In the zoom lens system, the third lens unit may be constituted of one positive lens.

When the zooming and the correction of aberration are mainly performed by the first and second lens units, and the third lens unit is constituted of one positive lens, miniaturization (reduction of the total length of the zoom lens system) can be realized.

The third lens unit of the zoom lens system may be constituted of one positive lens having at least one aspherical surface. Since the aspherical surface is used, both the correction of the off-axial aberration and the securing of the telecentricity are easily achieved, and the miniaturization of the third lens unit can be realized.

The zoom lens system may be constituted so that the second lens unit includes: a positive lens component; a negative lens component; and a positive lens component in order from the object side. Here, the lens component means a lens having an object-side surface and an image-side surface which come into contact with air and between which no air space is disposed, that is, a single lens element or a cemented lens. According to such constitution, it is possible to suppress aberration changes accompanying the movement of the lens unit. That is, the zooming function can be mainly shared by the second lens unit, and the constitution of the whole optical system can be preferably simplified.

The zoom lens system may be constituted so that the second lens unit has a positive lens component therein arranged closest to the object side, and the positive lens component satisfies the following condition (6A):

$$-8 < (r21+r22)/(r21-r22) < 0 \tag{6A},$$

wherein r21 denotes a paraxial radius of curvature of the object-side surface of the positive lens component, r22 denotes a paraxial radius of curvature of the image-side surface of the positive lens component, and the lens component is defined as a single lens element or a cemented lens.

When the positive lens having a strong convex surface on the object side is disposed closest to the object side in the second lens unit, the principal point of the second lens unit is positioned near the object side, and a high zooming ratio can be easily achieved. This constitution is effective especially in a case where the principal point of the first lens unit is disposed on the object side to reduce the outer diameter of the first lens unit as described above.

Below the lower limit of −8 of the condition (6A), the power of the lens becomes weak. As a result, it is difficult to simplify the constitution of the second lens unit. Above the upper limit of 0 of the condition (6A), the effect of disposing the principal point on the object side is reduced.

In the condition (6A), the lower limit may be set to preferably −2, more preferably −1.5 in order to secure the power of the lens component. The upper limit may be set to preferably −0.5, more preferably −0.8 in order to secure the zooming ratio easily. Both of the upper and lower limits of the condition (6A) are more preferably reduced so as to satisfy the following condition (6A'):

$$-2<(r21+r22)/(r21-r22)<-0.5 \quad (6A').$$

The lens surface closest to the object side in the second lens unit may be aspherical. According to such constitution, the aberration of the axial light flux can be corrected satisfactorily. The effect is improved especially in a case where the aperture stop is disposed on the object side of the second lens unit. The lens arranged closest to the object side in the second lens unit may be a positive lens having a convex surface on the object side. The axial light flux incident on the second lens unit is converged, and the lens diameter of the second lens unit is easily reduced. When the convex surface is provided with a strong power, the diameter of the second lens unit is advantageously reduced, but the spherical aberration is easily generated. When the surface is constituted to be aspherical, the spherical aberration can be corrected.

The zoom lens system may be constituted so that the second lens unit includes: a single lens element having a positive refractive power; a cemented lens of positive and negative lenses; and a single lens element having a positive refractive power in order from the object side.

When the cemented lens constituted of the positive and negative lenses is introduced, deterioration of performance by relative eccentricity of the negative lens with respect to the positive lens can be suppressed. Also the power arrangement in the second lens unit becomes substantially symmetrical. This power arrangement in the second lens unit is advantageous for the correction of aberration of the second lens unit itself. Further, since two positive lenses are arranged on the object side, the principal point of the second lens unit can be disposed near the object. This constitution is advantageous in securing the zooming ratio which satisfies the condition (2A).

The zoom lens system may satisfy one of, or a plurality of the following conditions (7A) to (11A):

$$IH/HB1<0.5 \quad (7A); \text{ and}$$

$$0.2<IH/HB1<0.5 \quad (7A'),$$

wherein HB1 denotes a distance from the vertex of the image-side lens surface to the rear principal point of the first lens unit, and the distance is set to be positive in a case where the distance is measured in the direction toward the object side.

Above the upper limit of 0.5 of the conditions (7A), (7A'), the rear principal point position (distance from the vertex of the image-side lens surface to the rear principal point of the first lens unit) of the first lens unit becomes short, and the height of ray entering the first lens increases. This is disadvantageous for miniaturization of the diameter of the first lens. When the lower limit of 0.2 of the condition (7A') is exceeded, and the principal point position of the first lens unit is disposed excessively close to the object side, the power of the first lens unit becomes excessively strong, and it is difficult to correct the aberration.

Moreover, the lower limit of the condition (7A') may be set to preferably 0.3, more preferably 0.35.

Furthermore, the upper limit of the condition (7A) or (7A') may be set to preferably 0.47, more preferably 0.45.

Another conditions are as follows:

$$3.2<f2G/fw \quad (8A); \text{ and}$$

$$3.2<f2G/fw<5.5 \quad (8A'),$$

wherein f2G is the focal length of the second lens unit.

Below the lower limit of 3.2 of the condition (8A), the power of the second lens unit becomes excessively strong. Therefore, it is difficult to suppress the aberration changes resulted from the movement of the lens unit for the zooming.

It is more preferable if the condition (8A') is satisfied.

Above the upper limit of 5.5 of the condition (8A'), the power of the second lens unit which mainly performs the zooming becomes weak, and the zooming function degrades. As a result, it becomes difficult to realize a high zooming ratio.

Moreover, the lower limit of the condition (8A') may be set to preferably 3.3, more preferably 3.5.

Furthermore, the upper limit of the condition (8A') may be set to preferably 5.0, more preferably 4.0.

Another condition is as follows:

$$IH/HD12w<0.13 \quad (9A),$$

wherein HD12w is the distance from the rear principal point of the first lens unit to the front principal point of the second lens unit in the wide angle end, and the distance measured toward the image side is set to be positive.

Above the upper limit of 0.13 of this condition (9A), the distance between the principal points of the first lens unit and, the second lens unit becomes short. Therefore, it is difficult to further reduce the distance between the principal points of the first lens unit and the second lens unit in the telephoto end, and it is difficult to obtain a high zooming ratio.

Moreover, the upper limit of the condition (9A) may be set to preferably 0.12, more preferably 0.11.

Another condition is as follows:

$$TLw/fw>13.5 \quad (10A),$$

wherein TLw denotes an axial distance from the incidence surface to the image surface of the zoom lens system in the wide angle end.

Below the lower limit of 13.5 of the condition (10A), it is difficult to correct the aberration sufficiently while a wide angle of view is maintained.

Moreover, the lower limit of the condition (10A) may be set to preferably 14.0, more preferably 15.0.

Furthermore, the upper limit of the condition (10A) may be set to be 25.0, and the total length of the zoom lens system in the wide angle end is preferably reduced.

Another condition is as follows:

$$2.0<|f1G/fw|<3.5 \quad (11A).$$

When the focal length of the first lens unit lengthens in excess of the upper limit of 3.5 of this condition (11A), the total length of the lens system in the wide angle end increases, and this is disadvantageous for miniaturization. When the focal length of the first lens unit shortens in excess of the lower limit of 2.0, the magnification of the second lens unit in the telephoto end becomes excessively large, and performance is easily deteriorated by manufacturing error.

Moreover, the lower limit of the condition (11A) may be set to preferably 2.4, more preferably 2.7.

Furthermore, the upper limit of the condition (11A) may be set to preferably 3.4, more preferably 3.3.

By combining above mentioned constitutions or conditions appropriately, combined effects of these constitutions and conditions may be obtained. This is more effective for obtaining desirable zoom lens system.

As described above, in another aspect of the present invention, a zoom lens system comprises: a first lens unit having a negative refractive power; a second lens unit having a positive refractive power; and a third lens unit having a positive refractive power in order from an object side, and spaces between the respective lens units are changed for performing zooming so that the zooming ratio exceeds two times. The zoom lens system satisfies the following condition (1B).

The first lens unit includes: a negative lens L11 whose absolute value of curvature of an image-side surface is larger than that of curvature of an object-side surface; and two lenses L12, L13 disposed on the image side of the negative lens L11.

The only lenses L11, L12, and L13 satisfy the following condition (4B) among the lenses included in the first lens unit.

Furthermore, the following conditions (2B), (3B), and (5B) are satisfied:

$$0.76 < IH/fw < 1.5 \quad (1B);$$

$$0.05 < |da/f1G| < 10 \quad (2B);$$

$$IH/HB1 < 0.5 \quad (3B);$$

$$0.5 < dx/d11 < 4 \quad (4B); \text{ and}$$

$$0.80 < (d11+d12+d13)/d\text{total} \leq 1.00 \quad (5B),$$

wherein IH is an image height of the zoom lens system, fw is a focal length in the wide angle end of the zoom lens system, f1G is a focal length of the first lens unit, HB1 is a distance from the vertex of the image-side lens surface to a rear principal point of the first lens unit, and the distance measured toward the image side is set to be positive, d11 is an axial thickness of the negative lens L11, d12 is an axial thickness of the lens L12, d13 is an axial thickness of the lens L13, dx is an axial thickness of the lens L1x (x=1, 2, ... ) in the first lens unit, dtotal is a sum of axial thicknesses of the lenses in the first lens unit; and da is an axial space between the first lens unit and the second lens unit at a time when the focal length fra of the zoom lens system has a value that satisfies the following condition (c):

$$IH/0.92 < fra < IH/0.76 \quad (c).$$

Since the zoom lens system includes the first lens unit having the negative refractive power and the second lens unit having the positive refractive power which is disposed on the image side of the first lens unit with a variable space from the first lens unit, a light flux entering at a large angle of view is refracted with the negative refractive power, and introduced into the second lens unit having the positive refractive power.

Therefore, even in a case where the focal length of the zoom lens system in the wide angle end is set so as to satisfy the condition (1B) in order to secure a large angle of view in the wide angle end, it is possible to reduce an outer diameter of the first lens unit. The reducing of the outer diameter of the first lens unit is advantageous in increasing the power of the first lens unit while reducing the length of the first lens unit.

Moreover, when the third lens unit having the positive refractive power is disposed on the image side of the second lens unit having the positive refractive power, it is possible to reduce change of the incidence angle of the light flux onto the image surface.

Especially in a case where an electronic image sensor to convert an optical image into an electric signal is disposed on the image side of the zoom lens system, since a telecentricity can be secured in the zoom lens system of the present invention, it is possible to reduce an adverse influence obtained at a time when light obliquely enters an image sensor.

Moreover, the power of the first lens unit is set to an appropriate value so as to satisfy the condition (2B) while satisfying the condition (1B). Accordingly, the total length is well balanced between the wide angle end and the telephoto end during photographing. As a result, the zoom lens system can be compact including the lens barrel structure.

Furthermore, the condition (3B) is satisfied, and the rear principal point of the first lens unit is positioned in a position separated from the image-side lens surface toward the object side. Accordingly, the first lens unit is positioned relatively close to the image with respect to the principal point. This enables to render the height of ray entering the first lens low. As a result, the diameter of the first lens can be reduced.

Especially, since axial thicknesses of the negative lenses constituting the first lens unit are reduced, an effect of miniaturization is intensified.

On the other hand, the axial thicknesses of three lenses can be increased to a certain degree among the lenses constituting the first lens unit to thereby increase strength of the lens assembly. According to such constitution, spaces between the respective lens surfaces are secured, and the aberration correction ability can be improved.

Therefore, in the zoom lens system, the thickness of each of the three lenses L11, L12, and L13 is set so as to satisfy the condition (4B). On the other hand, the condition (5B) is satisfied so that the number of thick lenses and the number of lenses constituting the first lens unit do not become excessively large.

It is to be noted that the negative lens L11 arranged close to an object is provided with a strong concave surface on an image side. Accordingly, an off-axial ray can enter the concave surface at a nearly right angle, and generation of aberration can be suppressed. The whole zoom lens system has a retrofocus type power arrangement, and the angle of view is easily enlarged.

On the other hand, the effective diameter of the lens subsequent to the negative lens L11 is reduced. Therefore, in order to reinforce the frame structure of the first lens unit (strength of the lens assembly including the lens and the lens frame supporting the lens is increased) and suppress enlargement while correcting the aberration. Moreover, it is preferable to secure an axial thickness by a plurality of lenses L12, L13 subsequent to the negative lens L11 in order to suppress enlargement while correcting the aberration. Conditions (4B) and (5B) define the above mentioned situation.

According to such constitution, the zoom lens system including a wide angle region and having a zooming ratio above 2 may be obtained while maintaining the compactness and satisfactory optical performance.

It is to be noted that above the lower limit of 0.76 of the condition (1B), the photographing area becomes narrow, and the photographing are cannot be covered even by image processing or the like. On the other hand, above the upper limit of 1.5 of the condition (1B), the load of the refractive power and the aberration correction on the negative first lens unit increase, and it is difficult to constitute the first lens unit to be compact.

Below the lower limit of 0.05 of the condition (2B), the first lens unit interferes with the second lens unit. Above the upper limit of 10 of the condition (2B), the power of the second lens unit becomes strong, and the constitution of and after the second lens unit becomes complicated.

Above the upper limit of 0.5 of the condition (3B), the position of the entrance pupil becomes far, the outer diameter of the first lens unit increases, and compactness is impaired.

Below the lower limit of 0.5 of the condition (4B), strengths of the lenses L12, L13 are reduced, and the strength of the lens assembly is impaired. The spaces between the respective lens surfaces become narrow, and it is difficult to correct the aberration effectively. On the other hand, above the upper limit of 4 of the condition (4B), the first lens unit lengthens, this diminishes the effect of miniaturization by satisfying the condition (3B), and compactness is impaired. Alternatively, the axial thickness of the negative lens L11 becomes excessively small, and the strength drops.

The condition (5B) demands that, when the first lens unit is constituted of four or more lenses, the lens or lenses except the three lenses that satisfy the condition (4B) have small axial thicknesses. When the condition (5B) is satisfied, the outer diameter of the lenses does not increase even in a case where the first lens unit has another lens in addition to the lenses L11, L12, and L13 in order to improve the performance. Above the lower limit of 0.80 of the condition (5B), the lens unit has a thick lens in addition to the three lenses mentioned above. Alternatively, the lens unit includes many lenses. Therefore, miniaturization becomes difficult.

It is to be noted that as to the condition (1B), the lower limit may be set to preferably 0.85, more preferably 0.87. The upper limit may be set to preferably 1.3, more preferably 1.1.

As to the condition (2B), the lower limit may be set to preferably 1.0, more preferably 2.0. The upper limit may be set to preferably 7.0, more preferably 5.0, further preferably 3.0.

The lower limit of the condition (3B) may be set to 0.2 to establish the following condition (3B'):

$$0.2 < IH/HB1 < 0.5 \tag{3B'}$$

Above the lower limit of 0.2 of this condition, the principal point of the first lens unit is positioned excessively close to the object side, the power of the first lens unit becomes excessively strong, and it becomes difficult to correct the aberration.

In the condition (3B'), the lower limit may be set to preferably 0.3, more preferably 0.35. In the condition (3B'), the upper limit may be set to preferably 0.47, more preferably 0.45.

As to the condition (4B), the lower limit may be set to preferably 0.7, more preferably 0.8. The upper limit may be set to preferably 3.0, more preferably 2.5.

Moreover, when the lens L12 is disposed closer to the object than the lens L13 in the first lens unit, it is desirable that the Lens L12 is constituted as a negative lens and the lens L13 is constituted as a positive lens. In this case, since the first lens unit has a function like a wide conversion lens, the angle of view can be easily enlarged.

Furthermore, when the following conditions are satisfied, the thickness of each lens can be well balanced with the burden of optical power on the lens:

$$0.7 < d12/d11 < 1.3; \text{ and}$$

$$1.5 < d13/d11 < 2.5.$$

In the condition (5B), the lower limit may be set to preferably 0.87, more preferably 0.93.

Moreover, an aperture stop is preferably disposed in the position between the first lens unit and the lens closest to the image side in the second lens unit in order to reduce the angle of emergence in the whole zoom lens system and correct the aberration of the whole lens system more easily while inhibiting enlargement of the outer diameter of the first lens unit.

Furthermore, on the condition (c), fra=fw may be set.

The zoom lens system may be constituted so as to satisfy the following condition:

$$0.2 < d11/IH < 1 \tag{6B}$$

Since the rays pass through a high position in the lens L11 of the first lens unit, the outer diameter of the lens becomes comparatively large. Therefore, it is not desirable in respect of the strength of the lens L11 that the thickness of the lens L11 falls below the lower limit of 0.2 of the condition (6B). Above the upper limit of 1, the entrance pupil becomes far, or the distance between the portion through which the light flux from the object enters the lens system and the portion through which the light flux exit from concave image-side surface of the lens L11 unfavorably lengthens.

As to the condition (6B), the lower limit may be set to preferably 0.1, more preferably 0.35. The upper limit may be set to preferably 0.6, more preferably 0.5.

The zoom lens system may be constituted so that the lens L12 is a negative meniscus lens which is disposed with an axial air space from the negative lens L11 on the image side of the lens L11 and which directs its convex surface toward the object side, and the lens L13 is a positive lens which is disposed with an axial air space from the lens L12 on the image side of the lens L12.

As to the lenses L11, L12, since the off-axial ray can be gradually bent, the generation of the off-axial aberration can be suppressed. Furthermore, when the lens L13 is disposed on the image surface side, chromatic aberration can be corrected.

When the whole first lens unit is constituted as a retrofocus system including the negative lenses L11, L12, and the positive lens L13, the principal point is disposed on the object side, and the outer diameter of the lens can be reduced. The first lens unit can be provided with a function like a wide conversion lens while suppressing the aberration.

In the zoom lens system, the first lens unit may be constituted of the negative lens L11, the negative meniscus lens L12, and the positive lens L13 in order from the object side.

As to the lenses L11, L12, since the off-axial ray can be gradually bent, the generation of the off-axial aberration can be suppressed. Furthermore, when the lens L13 is disposed on the image surface side, the chromatic aberration can be corrected.

When the whole first lens unit is constituted as the retrofocus system including the negative lenses L11, L12, and the positive lens L13, the principal point is disposed on the object side, and the outer diameter of the lens can be reduced. This structure is advantageous in respect of reduction of the number of lenses, shortening of the total length, or cost.

In the zoom lens system, the first lens unit may be constituted of four or more lenses. In addition to the negative lens L11, the lens L12, and the lens L13, at least one lens Ly1 satisfying the following condition may be disposed:

$$0 < dy1/d11 < 0.5 \quad (7B),$$

wherein dy1 denotes the axial thickness of the lens Ly1.

When the first lens unit is constituted of four or more lenses, the optical performance can further be improved. In general, it is well known that an optical performance can be enhanced, when the number of lenses is increased. However, in the zoom lens system having a large angle of view as in the present invention, it is required to decrease the height of ray incident onto the optical system from the optical axis for establishing both compactness and high performance. The performance is not improved only by increasing the number of lenses. Above the upper limit of 0.5 of the condition (7B), the first lens unit lengthens, the height of ray entering the lens increases, and the increase in the number of lenses produces only a small effect to improve the optical performance. Since the strength can be covered by another lens, as for the lower limit of the condition (7B), it is essential only that the thickness of the lens Ly1 is larger than 0.

When the Abbe number of the lens Ly1 is set to be larger than that of the lenses L12, L13, and the refractive index of the lens Ly1 is set to be smaller than that of the lenses L12, L13, the zoom lens system can be constituted advantageously for the correction of the chromatic aberration while keeping another aberration corrected state at a high level. The Abbe number of the lens Ly1 is more preferably larger than that of the lens L12 or L13 by 10 or more.

As to the condition (7B), when the lower limit is set to 0.05, the axial aberration can be easily corrected. The upper limit may be preferably set to 0.2 in respect of compactness. For example, the following condition (7B') is preferably satisfied:

$$0.05 < dy1/d11 < 0.2 \quad (7B').$$

The zoom lens system may be constituted so that the lens L12 is a negative meniscus lens which is disposed with an axial air space from the negative lens L11 on an image side of the lens L11 and which directs its convex surface toward the object side, the lens L13 is a positive lens which is disposed with an axial air space from the lens L12 on the image side of the lens L12, and the lens Ly1 is disposed on the image side of the lens L12 and is a negative lens.

As to the lenses L11, L12, since the off-axial ray can be gradually bent, the generation of the off-axial aberration can be suppressed. Furthermore, since the lens L13 is disposed on the image side of the lens L12, the chromatic aberration can be corrected.

When the whole first lens unit is constituted as a retrofocus system including the negative lenses L11, L12, and the positive lens L13, the principal point is disposed on the object side, and the outer diameter of the lens can be reduced. Furthermore, when the negative lens Ly1 is disposed on the image side of the lens L12, the constitution is advantageous for the correction of the off-axial aberration without changing the whole length of the lens unit. It is to be noted that the negative lens Ly1 may be formed on the image-side surface of the lens L12.

In the zoom lens system, the negative lens L11 is a negative meniscus lens which directs its convex surface toward the object side, and can be disposed closest to the object side in the first lens unit. According to such constitution, an off-axial aberration such as distortion easily generated on a wide-angle side is easily inhibited from being deteriorated, and the angle of view in the wide angle end can be easily increased.

At least one lens of the first lens unit may be a negative lens having an aspherical surface. According to such constitution, an off-axial aberration such as curvature of field can be efficiently corrected and the lens may be miniaturized.

The negative lens L12 may be a lens having two aspherical surfaces. According to such constitution, the number of aspherical surfaces increases, and the off-axial ray can be gradually provided with the effect by the aspherical surfaces. On the other hand, the number of lenses having an aspherical surface can be decreased, and this is advantageous in respect of a manufacturing aspect such as manufacturing cost.

The zoom lens system may be constituted so that an aperture stop is disposed, and the first lens unit moves, the second lens unit moves to the object side, and the aperture stop moves together with the second lens unit during zooming from the wide angle end to the telephoto end.

Since the aperture stop is moved together with the second lens unit which performs zooming, change of the region of the incident light flux onto the second lens unit can be reduced, and it is possible to suppress aberration change accompanying the movement of the second lens unit.

The aperture stop may be disposed between the first lens unit and the second lens unit. According to such constitution, the entrance pupil can be disposed in a shallow position, and the outer diameter of the first lens unit can be reduced. The eccentricity of the lens element by the manufacturing error in the second lens unit can be easily reduced, and the lens barrel structure or the lens constitution can be easily simplified.

The zoom lens system may include, as lens units having refractive powers, only three lens units: the first lens unit having the negative refractive power; the second lens unit having the positive refractive power; and the third lens unit having the positive refractive power. That is, the zoom lens system may be constituted to include only the three lens units. Alternatively, the zoom lens system may be constituted to include another lens unit in addition to the three lens units, which has no optical power.

The whole lens system may be constituted as a retrofocus system which includes small number of lens units and which is advantageous for a wide-angle lens system, and it is possible to control the position of the exit pupil suitably for an electronic image sensor.

The third lens unit may be constituted of one positive lens. When the first and second lens units mainly perform the zooming and correction of aberration, and third lens unit is constituted of one lens, the miniaturization can be realized.

The third lens unit may be composed of a positive lens having at least one aspherical surface.

When the aspherical surface is disposed, it is easy to establish both the correction of the off-axial aberration and the securing of the telecentricity, and the miniaturization of the third lens unit can be realized.

The zoom lens system may be constituted so that the second lens unit includes a positive lens component, a negative lens component, and a positive lens component in order from the object side. Here, a lens component is defined as a lens having an object-side surface and an image-side surface which come into contact with air and between which no air space is disposed, that is, a single lens element or a cemented lens. According to such constitution, it is possible to suppress the aberration changes accompanying the movement of the lens unit. That is, the second lens unit can mainly perform the zooming, and the constitution of the whole optical system can be preferably simplified.

The zoom lens system may be constituted such that the second lens unit has a positive lens component therein arranged closest to the object side, and the positive lens component satisfies the following condition (8B):

$$-8<(r21+r22)/(r21-r22)<0 \qquad (8B),$$

wherein, r21 denotes a paraxial radius of curvature of the object-side surface of the positive lens component, r22 denotes a paraxial radius of curvature of the image-side surface of the positive lens component, and the lens component is a single lens element or a cemented lens which has an object-side surface and an image-side surface that come into contact with air and between which there is no air space.

When the positive lens having a strong convex surface on the object side is disposed closest to the object side in the second lens unit, the principal point of the second lens unit is disposed closest to the object side, and a high zooming ratio can be easily achieved. Especially, the above constitution is effective in a case where the principal point of the first lens unit is disposed on the object side in order to reduce the outer diameter of the first lens unit.

Below the lower limit of −8 of the condition (8B), the power of the lens becomes weak. As a result, it becomes difficult to simplify the constitution of the second lens unit. Above the upper limit of 0 of the condition (8B), the effect to arrange the principal point on the object side is unfavorably reduced.

In the condition (8B), the lower limit may be set to preferably −2, more preferably −1.5. The upper limit may be set to preferably −0.5, more preferably −0.8.

For example, both of the upper and lower limits of the condition (8B) are more preferably reduced so as to establish the following condition (8B'):

$$-2<(r21+r22)/(r21-r22)<-0.5 \qquad (8B').$$

The lens surface of the second lens unit closest to the object side may be aspherical. According to such constitution, the aberration of the axial light flux can be corrected satisfactorily. The effect is improved especially in a case where the aperture stop is disposed on the object side of the second lens unit.

The zoom lens system may be constituted so that the second lens unit is constituted of: a single lens element having a positive refractive power; a cemented lens of positive and negative lenses; and a single lens element having a positive refractive power.

When the cemented lens constituted of the positive and negative lenses is introduced, it is possible to inhibit deterioration of the performance by eccentricity of the negative lens relative to the positive lens.

Moreover, while retaining the refractive power of the second lens unit, the power arrangement of the second lens unit is substantially symmetric. This serves to easily reduce the aberration of the second lens unit. This also serves to facilitate both the miniaturization of the second lens unit and the reduction of the aberration by the two positive lenses arranged on the object side in the second lens unit.

In the present invention, an electronic image pickup device includes: a zoom lens system according to the present invention; and an electronic image sensor which is disposed on the image side of the zoom lens system and which converts an optical image into an electric signal.

Since the zoom lens system of the present invention can secure telecentricity, it is possible to reduce adverse influences by the ray obliquely entering the image sensor. Here, the image height IH of the zoom lens system is a half of the length of the diagonal line of the effective image pickup region on the electronic image sensor. The effective image pickup region is the image pickup region for use in displaying, printing or the like of the received image on the photoelectric conversion surface of the electronic image sensor. Therefore, in a case where an image is displayed using electric signals obtained from all pixels included in the photoelectric conversion surface, the photoelectric conversion surface agrees with the effective image pickup region. However, in a case where the image is displayed using electric signals obtained from a part of pixels included in the photoelectric conversion surface, the effective image pickup region becomes smaller than the photoelectric conversion surface.

In the electronic image pickup device, the distortion may be corrected by the image processing proposed in U.S. Application Publication No. 2004/0201902A1 (the contents of which are incorporated herein by reference). It is also reported in U.S. Application Publication No. 2004/0201902A1 that it is easier to correct the distortion rather than coma or spherical aberration during the aberration correction by image processing. The image processing may be conducted by equipment other than camera used for photographing after the image is picked up.

Moreover, the zoom lens system or the electronic image pickup device may be constituted so as to satisfy any of the following conditions (9B) to (14B):

$$-0.07<IH/r1<0.07 \qquad (9B); \text{ and}$$

$$-0.015<IH/r1<0.04 \qquad (9B'),$$

wherein r1 denotes a paraxial radius of curvature of the lens surface closest to the object side in the first lens unit.

When increasing the paraxial radius of curvature of the lens surface (first surface) closest to the object side in the first lens unit, an entrance pupil can be disposed in a shallow position. Therefore, it is possible to reduce the outer diameter of the lens. This is also advantageous for correction of coma and maintaining the imaging performance while the angle of view is broadened. Since the curvature in the vicinity of the optical axis of the first surface is small on which the diameter of the axial light flux during zooming largely changes, change of the spherical aberration during zooming can be reduced, and a burden imposed on the second lens unit for correction of aberrations can be preferably reduced.

Below the lower limit of −0.07 of the condition (9B), the axial light flux is unfavorably excessively diverged in the first surface. Above the upper limit of 0.07, the position of the entrance pupil becomes deep, the outer diameter of the lens increases, and compactness is impaired. Moreover, the lens constitution of the first lens unit has to be complicated. Alternatively, the constitution is disadvantage for the correction of coma. Therefore, the constitution of the whole lens system unfavorably becomes complicated. Alternatively, the angle of view has to be reduced, and the photographing area has to be reduced.

In the condition (9B), the lower limit may be set to preferably −0.015, more preferably 0.0. The upper limit may be set to preferably 0.04, more preferably 0.033.

For example, both of the upper and lower limits of the condition (9B) are more preferably reduced so as to satisfy the following condition (9B').

Another conditions are as follows:

$$3.2 < f2G/fw \quad (10B); \text{ and}$$

$$3.2 < f2G/fw < 5.5 \quad (10B'),$$

wherein f2G denotes the focal length of the second lens unit.

Below the lower limit of 3.2 of the condition (10B), the power of the second lens unit which mainly performs zooming is excessively strong. It therefore becomes difficult to suppress aberration change accompanying the movement of the lens unit for zooming.

More preferably, the upper limit may be set to the condition (10B), and the condition (10B') is satisfied.

Above the upper limit of 5.5 of the condition (10B'), the power of the second lens unit which mainly performs zooming becomes weak, and the zooming function degrades. As a result, it is difficult to realize a high zooming ratio.

Moreover, in the condition (10B'), the lower limit may be set to preferably 3.3, more preferably 3.5. In the condition (10B'), the upper limit may be set to preferably 5.0, more preferably 4.0.

Another condition is as follows:

$$IH/HD12w < 0.13 \quad (11B),$$

wherein HD12w denotes the distance from the rear principal point of the first lens unit in the wide angle end to the front principal point of the second lens unit, and the image-side direction is regarded as positive.

Above the upper limit of 0.13 of the condition (11B), the distance between the principal points of the first lens unit and the second lens unit becomes short. Therefore, it becomes difficult to further reduce the distance between the principal points of the first lens unit and the second lens unit in the telephoto end, and high zooming ratio cannot be easily obtained.

Moreover, in the condition (11B), the upper limit may be set to preferably 0.12, more preferably 0.11.

Another condition is as follows:

$$TLw/fw > 13.5 \quad (12B),$$

wherein TLw is the axial distance from the incidence surface to the image surface of the zoom lens system in the wide angle end.

Below the lower limit of 13.5 of the condition (12B), it becomes difficult to correct aberrations sufficiently while maintaining a large angle of view.

Moreover, in the condition (12B), the lower limit may be set to preferably 14.0, more preferably 15.0.

Furthermore, the total length of the zoom lens system in the wide angle end is preferably reduced by setting the upper limit of 25.0 to the condition (12B).

Another condition is as follows:

$$2.0 < |f1G/fw| < 3.5 \quad (13B).$$

When the focal length of the first lens unit lengthens in excess of the upper limit of 3.5 of the condition (13B), the total length of the zoom lens system in the wide angle end lengthens, and miniaturization cannot be realized. When the focal length of the first lens unit shortens in excess of the lower limit of 2.0, the magnification of the second lens unit in the telephoto end becomes excessively large, and the performance is easily deteriorated by the manufacturing error.

Moreover, in the condition (13B), the lower limit may be set to preferably 2.4, more preferably 2.7.

Furthermore, in the condition (13B), then upper limit may be set to preferably 3.4, more preferably 3.3.

In addition, the zoom lens system may have a zooming ratio ft/fw (ft is a focal length of the zoom lens system in the telephoto end) satisfying the following condition (14B):

$$2.7 < ft/fw < 12 \quad (14B).$$

Below the lower limit of 2.7 of the condition (14B), a large degree of improvement in the compactness is not seen, but an image quality is unfavorably largely deteriorated at a time when a distant object is photographed in a large size. Above the upper limit of 12 of the condition (14B), the movement amount of the second lens unit becomes excessively large, and the compactness is impaired.

Furthermore, the lower limit of the condition (14B) may be set to preferably 3.0, more preferably 3.5, further preferably 4.0.

The upper limit may be set to preferably 7.0, more preferably 6.0.

When the above-described constitutions or conditions are appropriately combined, the effects described above are simultaneously obtained.

NUMERICAL EXAMPLES

Examples 1 to 5 of the zoom lens system according to the present invention will be described with reference to the drawings. FIGS. 1A to 5C are sectional views showing the lens arrangement including the optical axis at a time when the lens is focused on an infinite object in Examples 1 to 5, FIGS. 1A, 2A, 3A, 4A, and 5A show the arrangements in the wide angle ends, FIGS. 1B, 2B, 3B, 4B, and 5B show the arrangements in the intermediate focal length states, and FIGS. 1C, 2C, 3C, 4C, and 5C show the arrangements in the telephoto ends, respectively. In these drawings, the first lens unit is denoted with G1, the aperture stop is denoted with S, the second lens unit is denoted with G2, and the third lens unit is denoted with G3. Furthermore, F denotes plane parallel plates constituting a low pass filter coated with a wavelength region restricting coating which restricts infrared light, C denotes plane parallel plates of cover glass of an electronic image sensor such as a CCD image sensor or a CMOS image sensor, and I denotes an image surface. It is to be noted that the surface of the cover glass C may be coated with a multilayered film for restricting the wavelength region. The low pass filter function may be imparted to the cover glass C.

In Example 1, as shown in FIG. 1A, the zoom lens system includes a first lens unit G1 having a negative refractive power, an aperture stop S, a second lens unit G2 having a positive refractive power, and a third lens unit G3 having a positive refractive power in order from an object side. During zooming from a wide angle end to a telephoto end, the first lens unit G1 moves while drawing a locus concave toward the object side, the position of the first lens unit in the telephoto end being slightly closer to the image-surface side than that in the wide angle end, the aperture stop S and the second lens unit G2 integrally monotonously move toward the object side, and the third lens unit G3 moves toward the image side.

In order from the object side, the first lens unit G1 includes two negative meniscus lenses which direct their convex surfaces on the object side, and a positive meniscus lens which directs its convex surface on the object side. The second lens unit G2 includes a double-convex positive lens, a cemented lens of a positive meniscus lens which directs its convex surface on the object side and a negative meniscus lens which directs its convex surface on the object side, and a double-convex positive lens. The third lens unit G3 includes a double-convex positive lens.

Aspherical surfaces are used in five surfaces: opposite surfaces of the second negative meniscus lens from the object side of the first lens unit G1; the object-side surface of the double-convex positive lens on the object side in the second lens unit G2; and opposite surfaces of the double-convex positive lens of the third lens unit.

Figure 2A:
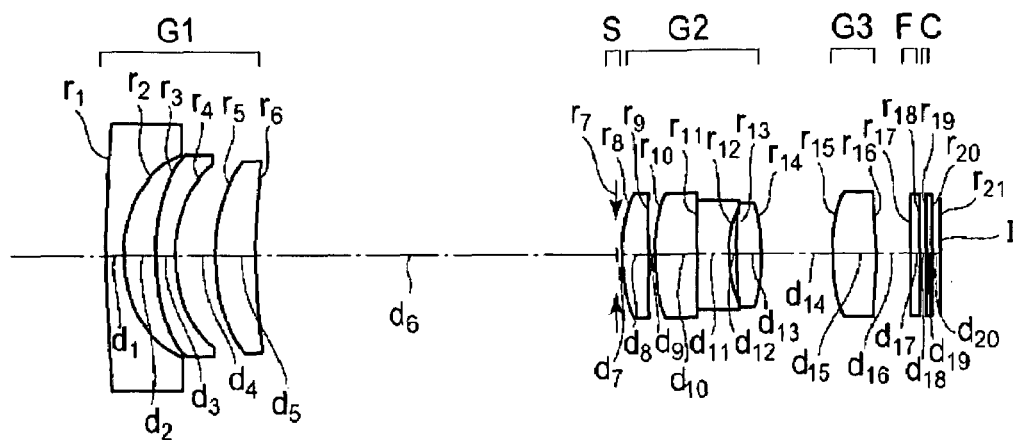
FIGS. 2A to 2C are sectional views of a zoom lens system of Example 2 of the present invention including an optical axis at a time when the lens is focused on an infinite object.
Figure 2B:
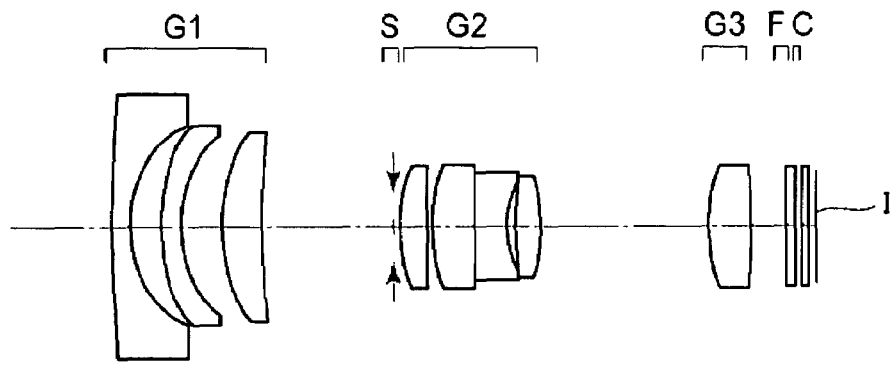
Figure 2C:
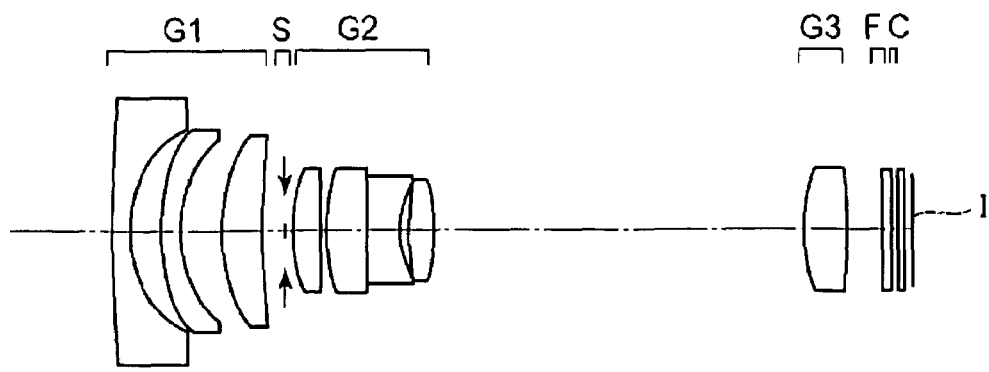

In Example 2, as shown in FIG. 2A, the zoom lens system includes a first lens unit G1 having a negative refractive power, an aperture stop S, a second lens unit G2 having a positive refractive power, and a third lens unit G3 having a positive refractive power in order from an object side. During zooming from a wide angle end to a telephoto end, the first lens unit G1 moves while drawing a locus concave toward the object side, the position of the first lens unit in the telephoto end being slightly closer to the image side than that in the wide angle end, the aperture stop S and the second lens unit G2 integrally monotonously move toward the object side, the third lens unit G3 moves toward the image side from the wide angle end to the intermediate focal length state, and the third lens unit becomes substantially stationary from the intermediate focal length state to the telephoto end.

In order from the object side, the first lens unit G1 includes two negative meniscus lenses which direct their convex surfaces on the object side, and a positive meniscus lens which directs its convex surface on the object side. The second lens unit G2 includes a double-convex positive lens, a cemented lens of a positive meniscus lens which directs its convex surface on the object side and a negative meniscus lens which directs its convex surface on the object side, and a double-convex positive lens. The third lens unit G3 includes a double-convex positive lens.

Aspherical surfaces are used in five surfaces: opposite surfaces of the second negative meniscus lens from the object side of the first lens unit G1; the object-side surface of the double-convex positive lens on the object side in the second lens unit G2; and opposite surfaces of the double-convex positive lens of the third lens unit.

Figure 3A:
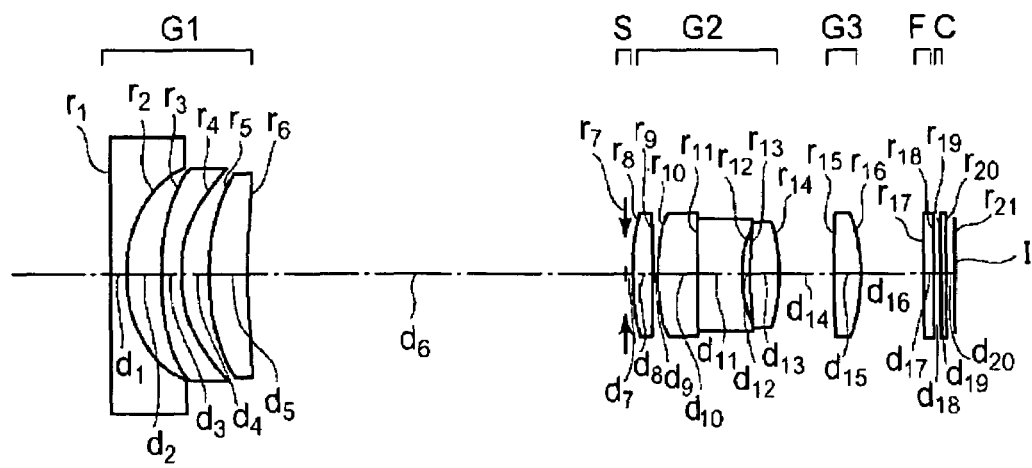
FIGS. 3A to 3C are sectional views of a zoom lens system of Example 3 of the present invention including an optical axis at a time when the lens is focused on an infinite object.
Figure 3B:
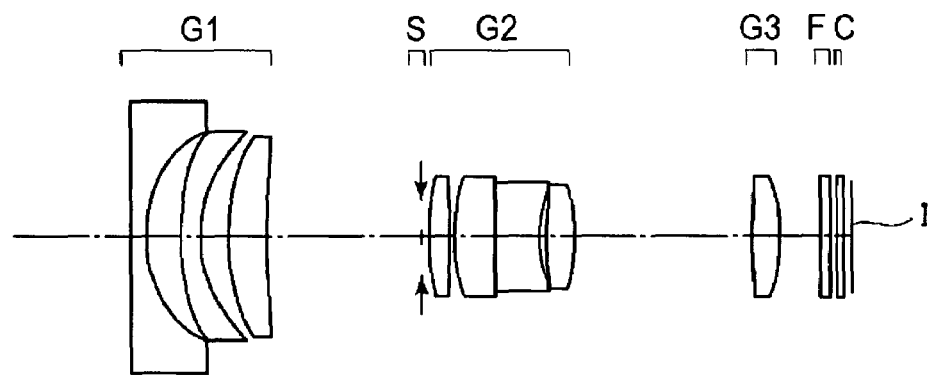
Figure 3C:
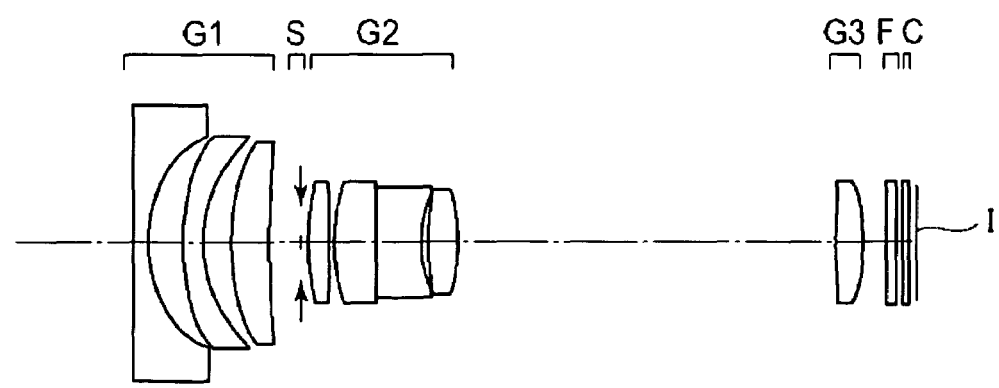

In Example 3, as shown in FIG. 3A, the zoom lens system includes a first lens unit G1 having a negative refractive power, an aperture stop S, a second lens unit G2 having a positive refractive power, and a third lens unit G3 having a positive refractive power in order from an object side. During zooming from a wide angle end to a telephoto end, the first lens unit G1 moves while drawing a locus concave toward the object side, the position of the first lens unit in the telephoto end being closer to the image side than that in the wide angle end, the aperture stop S and the second lens unit G2 integrally monotonously move on the object side, and the third lens unit G3 moves toward the image side.

In order from the object side, the first lens unit G1 includes two negative meniscus lenses which direct their convex surfaces on the object side, and a positive meniscus lens which directs its convex surface on the object side. The second lens unit G2 includes a positive meniscus lens which directs its convex surface on the object side, a cemented lens of a positive meniscus lens which directs its convex surface on the object side and a negative meniscus lens which directs its convex surface on the object side, and a double-convex positive lens. The third lens unit G3 includes a double-convex positive lens.

Aspherical surfaces are used in five surfaces: opposite surfaces of the second negative meniscus lens from the object side of the first lens unit G1; the object-side surface of the positive meniscus lens on the object side in the second lens unit G2; and opposite surfaces of the double-convex positive lens of the third lens unit G3.

Figure 4A:
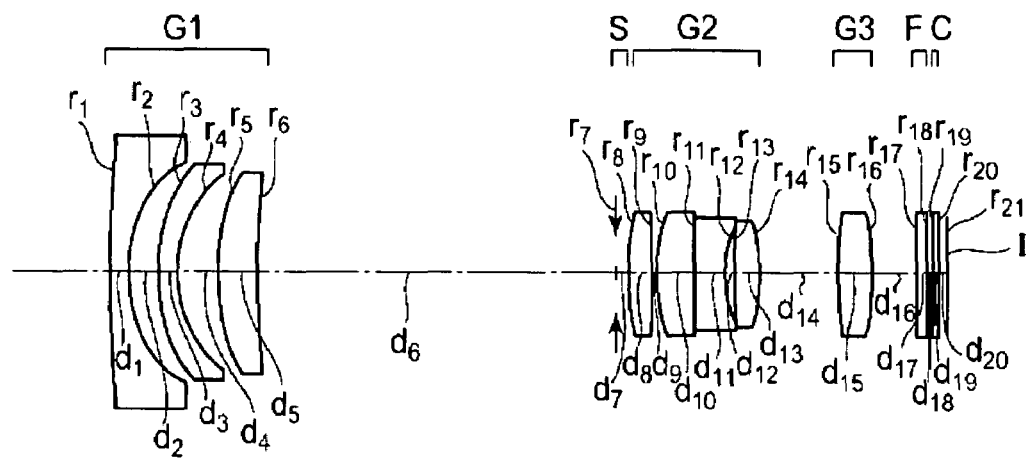
FIGS. 4A to 4C are sectional views of a zoom lens system of Example 4 of the present invention including an optical axis at a time when the lens is focused on an infinite object.
Figure 4B:
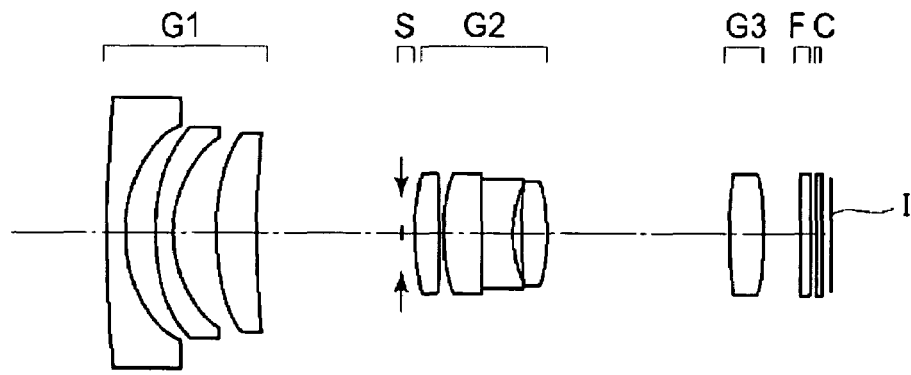
Figure 4C:
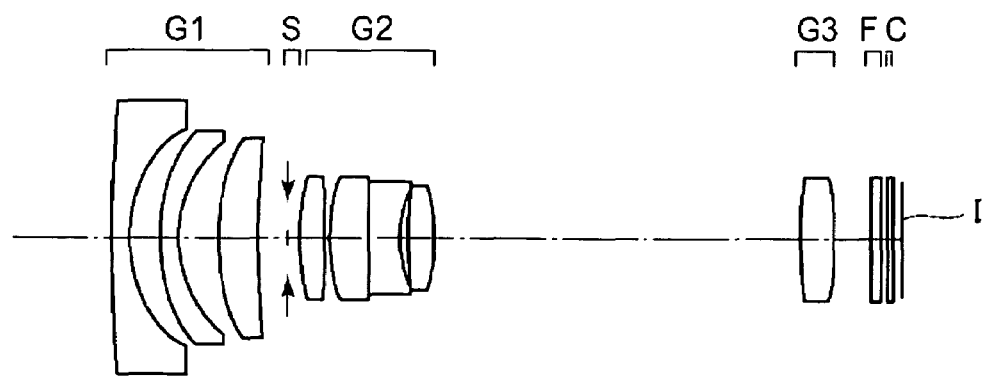

In Example 4, as shown in FIG. 4A, a zoom lens system includes a first lens unit G1 having a negative refractive power, an aperture stop S, a second lens unit G2 having a positive refractive power, and a third lens unit G3 having a positive refractive power in order from an object side. During zooming from the wide angle end to the telephoto end, the first lens unit G1 moves while drawing a locus concave toward the object side, the position of the first lens unit in the telephoto end being closer to the image side than that in the wide angle end, the aperture stop S and the second lens unit G2 integrally monotonously move toward the object side, and the third lens unit G3 moves toward the image side.

In order from the object side, the first lens unit G1 includes two negative meniscus lenses which direct their convex surfaces on the object side, and a positive meniscus lens which directs its convex surface on the object side. The second lens unit G2 includes a double-convex positive lens, a cemented lens of a positive meniscus lens which directs its convex surface on the object side and a negative meniscus lens which directs its convex surface on the object side, and a double-convex positive lens. The third lens unit G3 includes a double-convex positive lens.

Aspherical surfaces are used in five surfaces: opposite surfaces of the second negative meniscus lens from the object side of the first lens unit G1; the object-side surface of the double-convex positive lens on the object side in the second lens unit G2; and opposite surfaces of the double-convex positive lens of the third lens unit G3.

Figure 5A:
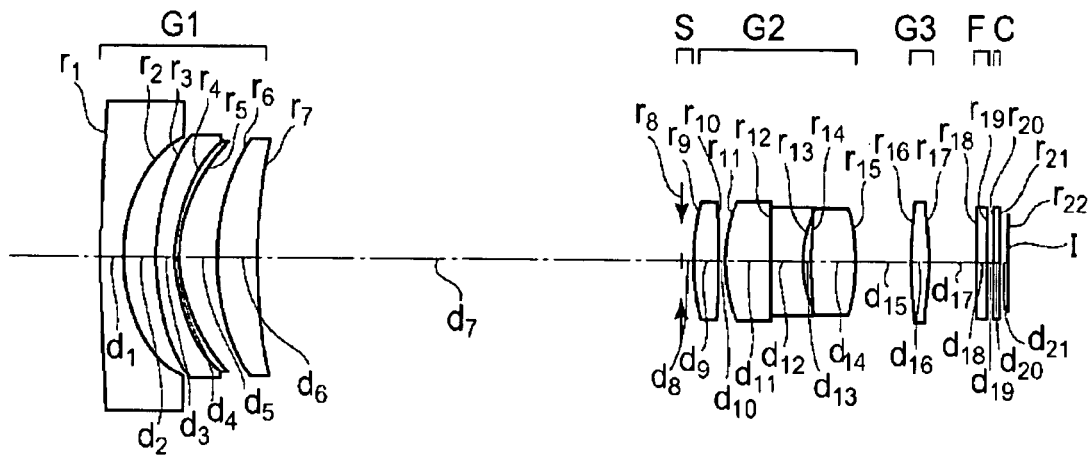
FIGS. 5A to 5C are sectional views of a zoom lens system of Example 5 of the present invention including an optical axis at a time when the lens is focused on an infinite object.
Figure 5B:
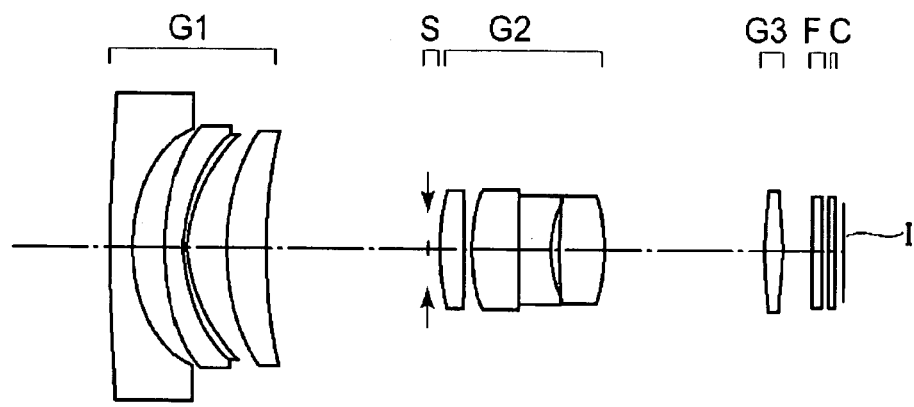
Figure 5C:
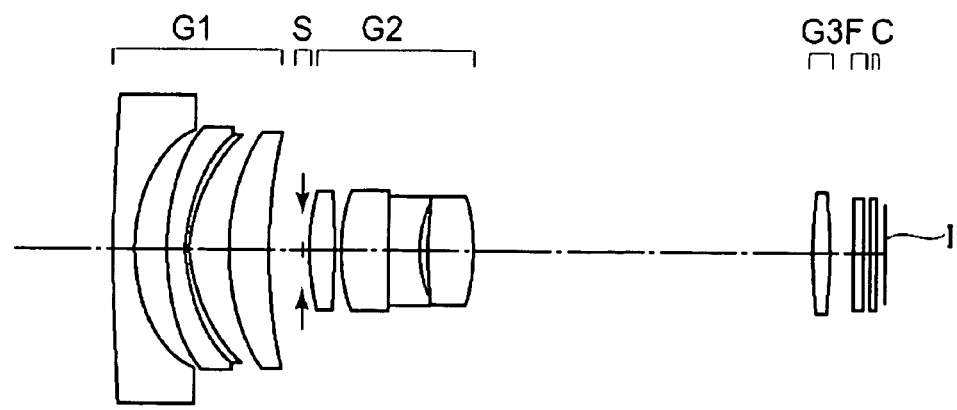
Figure 6A:
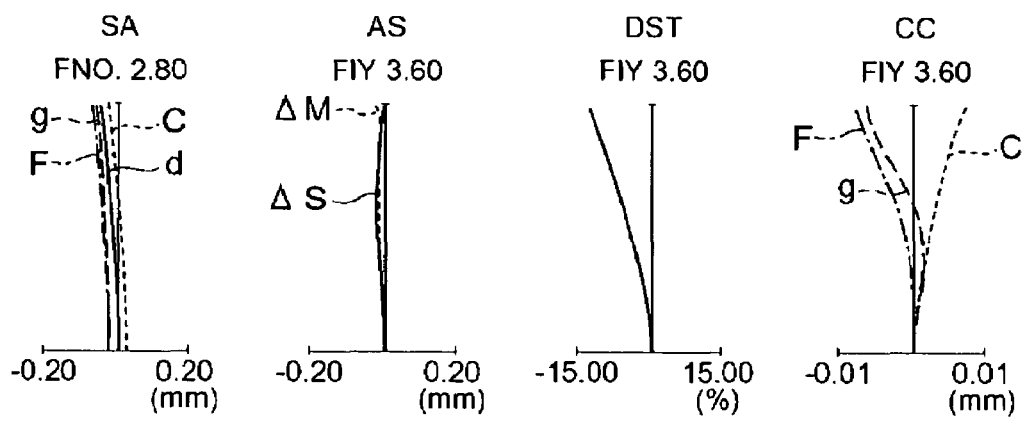
FIGS. 6A to 6C show spherical aberration, astigmatism, distortion, and chromatic aberration of magnification of Example 1.
Figure 6B:
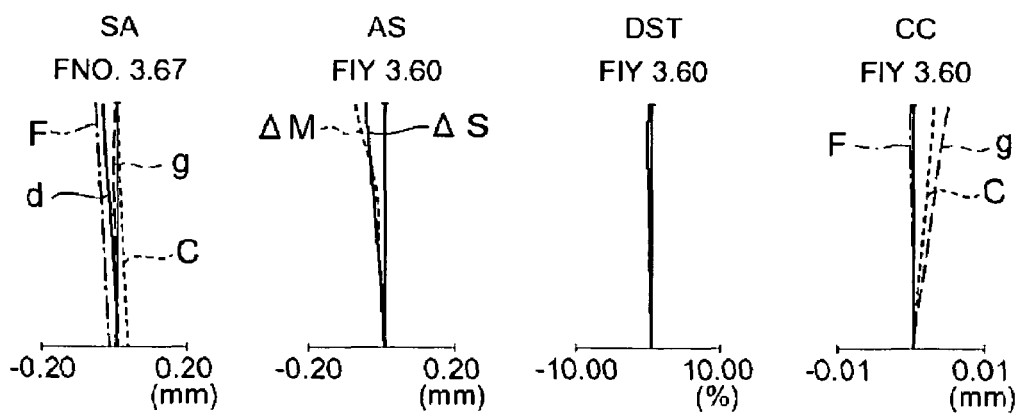
Figure 6C:
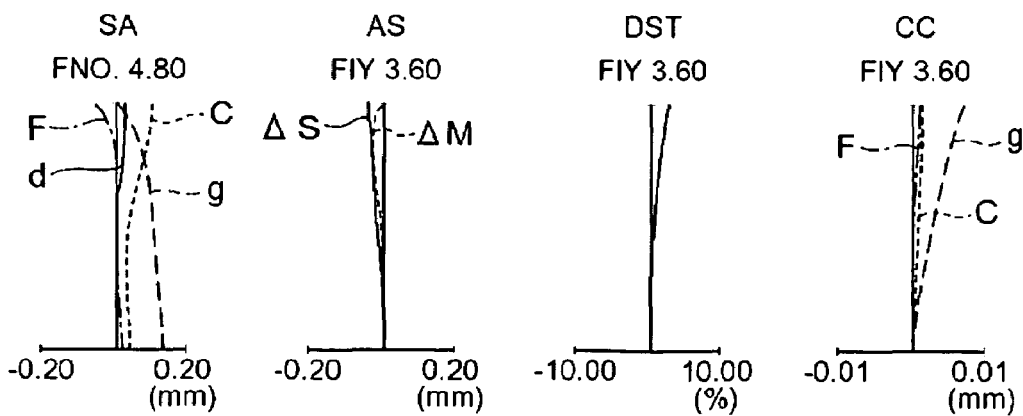
Figure 7A:
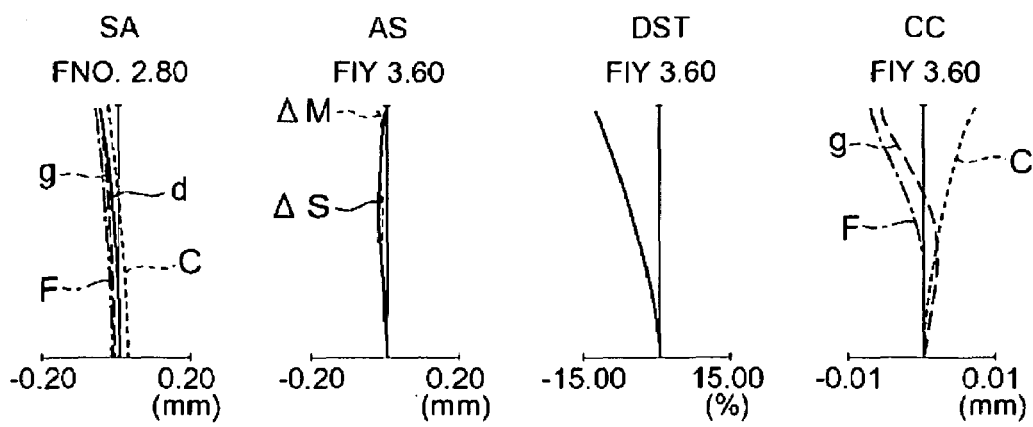
FIGS. 7A to 7C show spherical aberration, astigmatism, distortion, and chromatic aberration of magnification of Example 2.
Figure 7B:
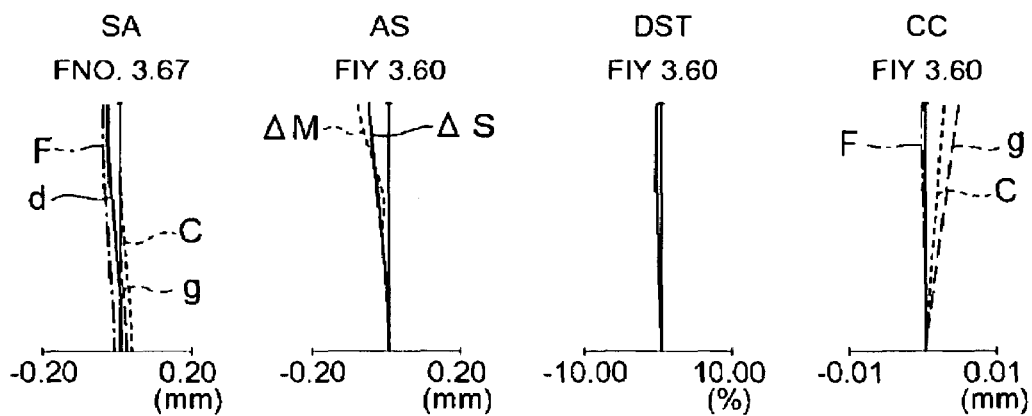
Figure 7C:
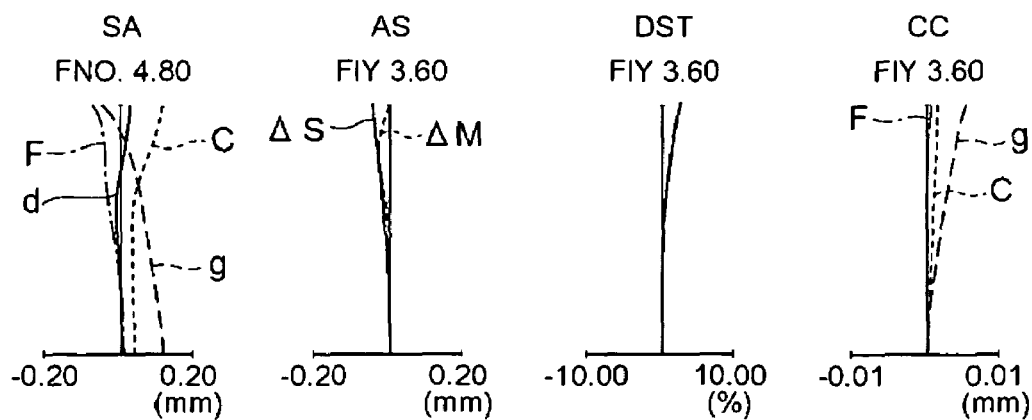
Figure 8A:
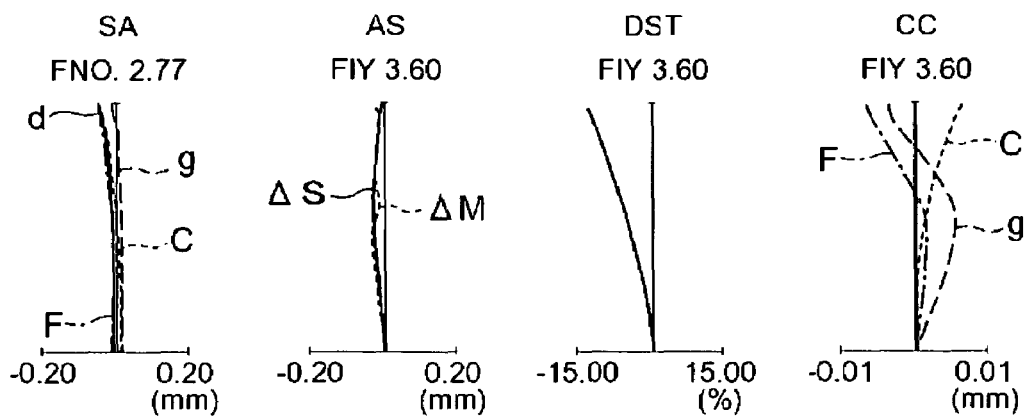
FIGS. 8A to 8C show spherical aberration, astigmatism, distortion, and chromatic aberration of magnification of Example 3.
Figure 8B:
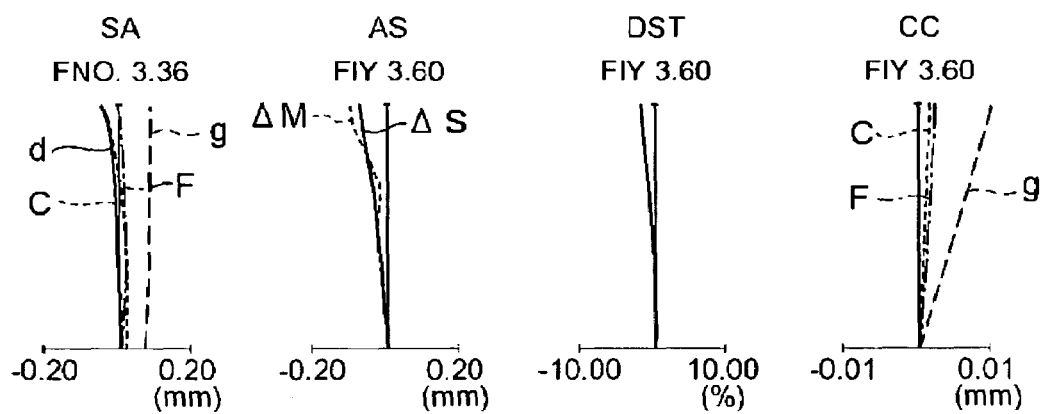
Figure 8C:
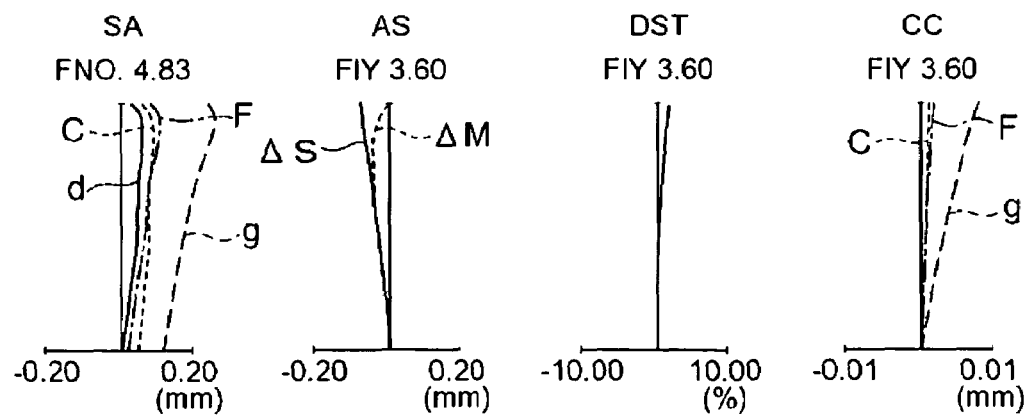
Figure 10A:
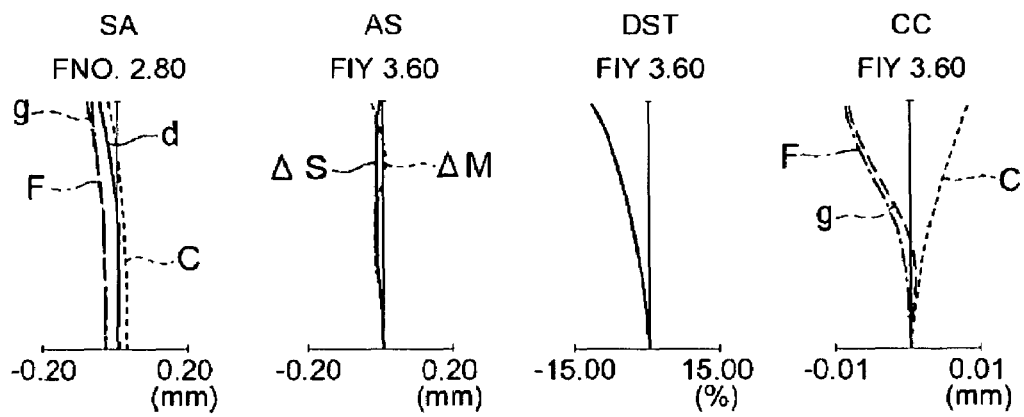
FIGS. 10A to 10C show spherical aberration, astigmatism, distortion, and chromatic aberration of magnification of Example 5.
Figure 10B:
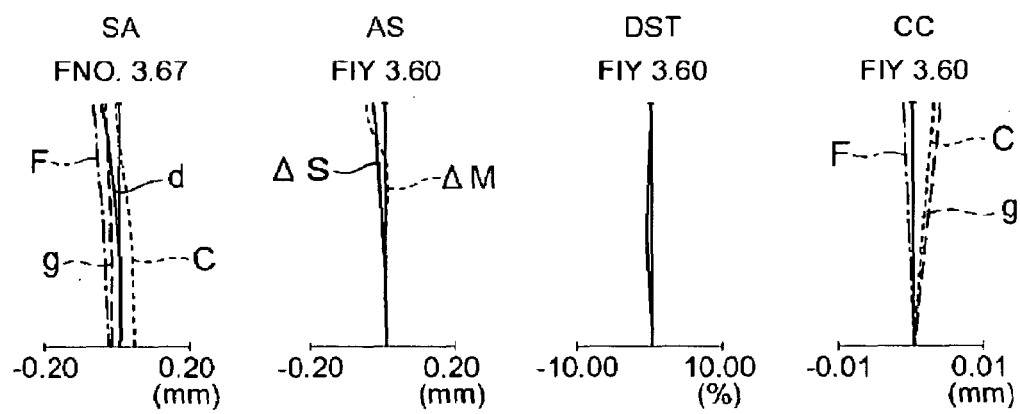
Figure 10C:
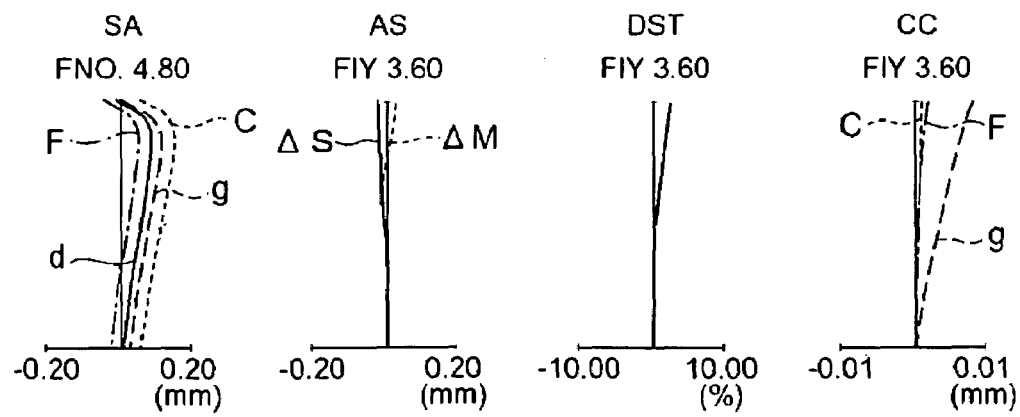

In Example 5, as shown in FIG. 5A, the zoom lens system includes a first lens unit G1 having a negative refractive power, an aperture stop S, a second lens unit G2 having a positive refractive power, and a third lens unit G3 having a positive refractive power in order from an object side. During zooming from a wide angle end to a telephoto end, the first lens unit G1 moves while drawing a locus concave toward the object side, the position of the first lens unit in the telephoto end being closer to the image side than that in the wide angle end, the aperture stop S and the second lens unit G2 integrally monotonously move toward the object side, and the third lens unit G3 moves toward the image side.

In order from the object side, the first lens unit G1 includes a negative meniscus lens which directs its convex surface on the object side, a cemented lens of a negative meniscus lens which directs its convex surface on the object side and a negative meniscus lens which directs its convex surface on the object side, and a positive meniscus lens which directs its convex surface on the object side. The second lens unit G2 includes a double-convex positive lens, a cemented lens of a positive meniscus lens which directs its convex surface on the object side and a negative meniscus lens which directs its convex surface on the object side, and a double-convex positive lens. The third lens unit G3 includes a double-convex positive lens.

Aspherical surfaces are used in four surfaces: the surface of the cemented lens of the first lens unit G1 closest to the image side; the object-side surface of the double-convex positive lens on the object side in the second lens unit G2; and opposite surfaces of the double-convex positive lens of the third lens unit G3.

In any of the above-described zoom lens systems, focusing on an object at a short distance may be performed by movement of the whole lens system or the specific lens unit. When the only third lens unit is moved for focusing, it is preferable to reduce the number of lenses that move for focusing and suppress the change of magnification during focusing.

It is to be noted that a region of an actual angle 2 ω of view from the wide angle end to the telephoto end in Examples 1 to 5 is as follows:

Example 1: actual field angle 2 ω of 91.7° to 21.8°;
Example 2: actual field angle 2 ω of 91.7° to 21.7°;
Example 3: actual field angle 2 ω of 91.6° to 22.3°;
Example 4: actual field angle 2 ω of 82.9° to 21.9°; and
Example 5: actual field angle 2 ω of 90.9° to 21.6°.

Numerical data of the above examples will be described hereinafter. In addition to the above-described symbols, f denotes the focal length of the zoom lens; FNO is the F number; WE denotes the wide angle end; ST denotes then intermediate focal length state; TE denotes the telephoto end; r1, r2 . . . denote a radius of curvature of each lens surface; d1, d2 . . . denote an air space between the lens surfaces; nd1, nd2 . . . denote a refractive index for the d-line of each lens; and vd1, vd2 . . . denote the Abbe number of each lens. It is to be noted that assuming that the x-axis is matched with the optical axis whose light travel direction is positive, and the y-axis extends in a direction crossing the optical axis at right angles, the shape of the aspherical surface is represented in by the following equation.

$$x=(y^2/r)[1+\{1-(K+1)(y/r)^2\}^{1/2}]+A4 \cdot y^4+A6 \cdot y^6+A8 \cdot y^8+A10 \cdot y^{10},$$

wherein r denotes a paraxial radius of curvature, K denotes a conical coefficient, and A4, A6, A8, and A10 denote 4th, 6th, 8th, and 10th order aspherical coefficients, respectively. It is to be noted that "E-2" or the like in the data means multiplying by a power of 10. Therefore, for example, a value of $A_4$ of the third surface of Example 1 is 6.45927×$10^{-5}$.

Example 1

TABLE 1

| r1 = 120.490 | d1 = 1.31 | nd1 = 1.77250 | vd1 = 49.60 |
| r2 = 8.803 | d2 = 2.41 | | |
| r3 = 18.045* | d3 = 1.43 | nd2 = 1.74330 | vd2 = 49.33 |
| r4 = 8.094* | d4 = 3.05 | | |

TABLE 1-continued

| r5 = 14.990 | d5 = 2.92 | nd3 = 1.84666 | vd3 = 23.78 |
| r6 = 40.520 | d6 = variable | | |
| r7 = ∞ (AS) | d7 = 0.50 | | |
| r8 = 14.360* | d8 = 1.96 | nd4 = 1.74330 | vd4 = 49.33 |
| r9 = −331.278 | d9 = 0.37 | | |
| r10 = 12.927 | d10 = 3.50 | nd5 = 1.77250 | vd5 = 49.60 |
| r11 = 115.263 | d11 = 2.37 | nd6 = 1.84666 | vd6 = 23.78 |
| r12 = 7.486 | d12 = 0.69 | | |
| r13 = 33.417 | d13 = 1.95 | nd7 = 1.48749 | vd7 = 70.23 |
| r14 = −13.786 | d14 = variable | | |
| r15 = 21.995* | d15 = 2.97 | nd8 = 1.49700 | vd8 = 81.54 |
| r16 = −21.106* | d16 = variable | | |
| r17 = ∞ | d17 = 0.76 | nd9 = 1.54771 | vd9 = 62.84 |
| r18 = ∞ | d18 = 0.44 | | |
| r19 = ∞ | d19 = 0.40 | nd10 = 1.51633 | vd10 = 64.14 |
| r20 = ∞ | d20 = 0.60 | | |
| r21 = ∞ (IS) | | | |

*Aspherical Surface
AS: Aperture Stop
IS: Image Surface

TABLE 2

Aspherical Coefficients

| Surface | K | A4 | A6 | A8 | A10 |
| --- | --- | --- | --- | --- | --- |
| 3 | −2.076 | 6.45927E−5 | 6.49359E−6 | −8.75295E−8 | 3.45632E−10 |
| 4 | −0.123 | −2.45406E−4 | 6.68743E−6 | −1.43236E−7 | −2.58394E−10 |
| 8 | −2.842 | 5.45802E−5 | −8.40498E−7 | 3.93728E−8 | −8.90443E−10 |
| 15 | 17.207 | −4.08931E−4 | 3.36877E−5 | −1.34835E−6 | 1.83688E−8 |
| 16 | −5.667 | −2.68421E−4 | 8.59656E−5 | −4.00016E−6 | 9.20195E−8 |

TABLE 3

Zoom Data (∞)

| | WE | ST | TE |
| --- | --- | --- | --- |
| f (mm) | 3.991 | 8.545 | 18.189 |
| FNO | 2.80 | 3.67 | 4.80 |
| d6 | 26.79 | 9.98 | 2.08 |
| d14 | 5.33 | 12.90 | 28.33 |
| d16 | 2.41 | 2.20 | 1.98 |

Example 2

TABLE 4

| r1 = 118.807 | d1 = 1.31 | nd1 = 1.77250 | vd1 = 49.60 |
| r2 = 8.809 | d2 = 2.41 | | |
| r3 = 18.035* | d3 = 1.39 | nd2 = 1.74330 | vd2 = 49.33 |
| r4 = 7.941* | d4 = 3.10 | | |
| r5 = 15.161 | d5 = 3.00 | nd3 = 1.84666 | vd3 = 23.78 |
| r6 = 44.116 | d6 = variable | | |
| r7 = ∞ (AS) | d7 = 0.50 | | |
| r8 = 12.553* | d8 = 2.00 | nd4 = 1.74330 | vd4 = 49.33 |
| r9 = −1072.915 | d9 = 0.47 | | |
| r10 = 14.652 | d10 = 2.88 | nd5 = 1.77250 | vd5 = 49.60 |
| r11 = 116.690 | d11 = 2.58 | nd6 = 1.84666 | vd6 = 23.78 |
| r12 = 7.579 | d12 = 0.66 | | |
| r13 = 28.801 | d13 = 1.98 | nd7 = 1.48749 | vd7 = 70.23 |
| r14 = −13.779 | d14 = variable | | |

TABLE 4-continued

| | | | | | |
|---|---|---|---|---|---|
| r15 = 25.196* | d15 = 3.23 | | nd8 = 1.49700 | vd8 = 81.54 |
| r16 = −20.772* | d16 = variable | | | |
| r17 = ∞ | d17 = 0.76 | | nd9 = 1.54771 | vd9 = 62.84 |
| r18 = ∞ | d18 = 0.44 | | | |
| r19 = ∞ | d19 = 0.40 | | nd10 = 1.51633 | vd10 = 64.14 |
| r20 = ∞ | d20 = 0.60 | | | |
| r21 = ∞ (IS) | | | | |

*Aspherical Surface
AS: Aperture Stop
IS: Image Surface

TABLE 5

Aspherical Coefficients

| Surface | K | A4 | A6 | A8 | A10 |
|---|---|---|---|---|---|
| 3 | −2.753 | 5.55177E−5 | 6.78542E−6 | −8.75312E−8 | 3.00839E−10 |
| 4 | −0.154 | −2.78544E−4 | 7.01729E−6 | −1.42051E−7 | −3.59350E−10 |
| 8 | −2.029 | 4.38908E−5 | −2.45433E−7 | −8.67387E−9 | 4.57999E−10 |
| 15 | 26.077 | −4.19155E−4 | 3.06327E−5 | −1.13473E−6 | 3.54518E−9 |
| 16 | −3.248 | −2.66612E−4 | 8.09076E−5 | −3.64091E−6 | 7.64667E−8 |

TABLE 6

Zoom Data (∞)

| | WE | ST | TE |
|---|---|---|---|
| f (mm) | 3.990 | 8.545 | 18.288 |
| FNO | 2.80 | 3.67 | 4.80 |
| d6 | 26.74 | 9.60 | 1.50 |

TABLE 6-continued

Zoom Data (∞)

| | WE | ST | TE |
|---|---|---|---|
| d14 | 5.18 | 12.57 | 28.03 |
| d16 | 2.52 | 2.40 | 2.40 |

Example 3

TABLE 7

| | | | | | |
|---|---|---|---|---|---|
| r1 = 4500.383 | d1 = 1.32 | | nd1 = 1.77250 | vd1 = 49.60 |
| r2 = 9.359 | d2 = 2.41 | | | |
| r3 = 24.524* | d3 = 1.39 | | nd2 = 1.74330 | vd2 = 49.33 |
| r4 = 8.963* | d4 = 2.41 | | | |
| r5 = 17.943 | d5 = 2.89 | | nd3 = 1.84666 | vd3 = 23.78 |
| r6 = 284.297 | d6 = variable | | | |
| r7 = ∞ (AS) | d7 = 0.50 | | | |

TABLE 7-continued

| | | | | | |
|---|---|---|---|---|---|
| r8 = 19.436* | d8 = 1.53 | | nd4 = 1.74330 | vd4 = 49.33 |
| r9 = 137.997 | d9 = 0.18 | | | |
| r10 = 11.381 | d10 = 3.19 | | nd5 = 1.77250 | vd5 = 49.60 |
| r11 = 4390.531 | d11 = 3.25 | | nd6 = 1.84666 | vd6 = 23.78 |
| r12 = 8.260 | d12 = 0.69 | | | |
| r13 = 26.872 | d13 = 2.09 | | nd7 = 1.48749 | vd7 = 70.23 |
| r14 = −12.935 | d14 = variable | | | |
| r15 = 24.500* | d15 = 1.90 | | nd8 = 1.49700 | vd8 = 81.54 |
| r16 = −24.796* | d16 = variable | | | |
| r17 = ∞ | d17 = 0.76 | | nd9 = 1.54771 | vd9 = 62.84 |
| r18 = ∞ | d18 = 0.44 | | | |

TABLE 7-continued

| | | | | | |
|---|---|---|---|---|---|
| r19 = ∞ | d19 = 0.40 | | nd10 = 1.51633 | vd10 = 64.14 |
| r20 = ∞ | d20 = 0.60 | | | |
| r21 = ∞ (IS) | | | | |

*Aspherical Surface
AS: Aperture Stop
IS: Image Surface

TABLE 8

Aspherical Coefficients

| Surface | K | A4 | A6 | A8 | A10 |
|---|---|---|---|---|---|
| 3 | 0.000 | −1.09346E−22 | 7.42289E−6 | −8.34361E−8 | 2.82193E−10 |
| 4 | −0.145 | −2.76977E−4 | 8.02851E−6 | −1.22644E−7 | −8.03256E−13 |
| 8 | −4.326 | 3.58731E−6 | 1.37882E−6 | −1.18290E−7 | 3.57210E−9 |
| 15 | 27.818 | −5.16300E−4 | −6.63410E−7 | −1.73194E−6 | −5.52968E−10 |
| 16 | 0.000 | −2.87839E−4 | 4.85820E−5 | −5.34160E−6 | 1.27186E−7 |

TABLE 9

Zoom Data (∞)

| | WE | ST | TE |
|---|---|---|---|
| f (mm) | 3.995 | 8.550 | 17.995 |
| FNO | 2.77 | 3.36 | 4.83 |
| d6 | 27.65 | 10.79 | 2.05 |
| d14 | 3.80 | 13.22 | 27.89 |
| d16 | 4.77 | 3.08 | 1.86 |

Example 4

TABLE 10

| | | | | | |
|---|---|---|---|---|---|
| r1 = 121.056 | d1 = 1.43 | | nd1 = 1.77250 | vd1 = 49.60 |
| r2 = 9.380 | d2 = 2.15 | | | |

TABLE 10-continued

| | | | |
|---|---|---|---|
| r3 = 16.015* | d3 = 1.44 | nd2 = 1.74330 | vd2 = 49.33 |
| r4 = 8.193* | d4 = 2.98 | | |
| r5 = 16.120 | d5 = 2.94 | nd3 = 1.84666 | vd3 = 23.78 |
| r6 = 45.014 | d6 = variable | | |
| r7 = ∞ (AS) | d7 = 0.47 | | |
| r8 = 14.773* | d8 = 1.86 | nd4 = 1.74330 | vd4 = 49.33 |
| r9 = −994.295 | d9 = 0.33 | | |
| r10 = 13.147 | d10 = 2.82 | nd5 = 1.77250 | vd5 = 49.60 |
| r11 = 72.079 | d11 = 2.42 | nd6 = 1.84666 | vd6 = 23.78 |
| r12 = 8.130 | d12 = 0.66 | | |
| r13 = 29.342 | d13 = 1.71 | nd7 = 1.48749 | vd7 = 70.23 |
| r14 = −16.090 | d14 = variable | | |
| r15 = 25.866* | d15 = 2.62 | nd8 = 1.49700 | vd8 = 81.54 |
| r16 = −21.997* | d16 = variable | | |
| r17 = ∞ | d17 = 0.76 | nd9 = 1.54771 | vd9 = 62.84 |
| r18 = ∞ | d18 = 0.44 | | |
| r19 = ∞ | d19 = 0.40 | nd10 = 1.51633 | vd10 = 64.14 |
| r20 = ∞ | d20 = 0.60 | | |
| r21 = ∞ (IS) | | | |

*Aspherical Surface
AS: Aperture Stop
IS: Image Surface

TABLE 11

Aspherical Coefficients

| Surface | K | A4 | A6 | A8 | A10 |
|---|---|---|---|---|---|
| 3 | −8.593 | −5.21721E−5 | 1.35472E−5 | −1.60073E−7 | 8.18893E−10 |
| 4 | −0.267 | −5.36622E−4 | 1.87785E−5 | −2.34186E−7 | 6.47476E−10 |
| 8 | −2.764 | 3.65365E−5 | 1.70796E−6 | −1.47291E−7 | 4.47653E−9 |
| 15 | 31.103 | −5.88505E−4 | 5.86985E−6 | −6.62903E−7 | 3.27987E−9 |
| 16 | −3.969 | −6.53373E−4 | 9.42874E−5 | −6.79301E−6 | 1.91081E−7 |

TABLE 12

Zoom Data (∞)

| | WE | ST | TE |
|---|---|---|---|
| f (mm) | 4.460 | 9.095 | 18.274 |
| FNO | 2.80 | 3.67 | 4.80 |
| d6 | 26.31 | 10.64 | 2.46 |
| d14 | 5.71 | 13.58 | 26.94 |
| d16 | 3.41 | 2.53 | 2.23 |

Example 5

TABLE 13

| | | | |
|---|---|---|---|
| r1 = 175.213 | d1 = 1.72 | nd1 = 1.77250 | vd1 = 49.60 |
| r2 = 10.494 | d2 = 2.72 | | |
| r3 = 16.452 | d3 = 1.45 | nd2 = 1.80610 | vd2 = 40.92 |

TABLE 13-continued

| | | | |
|---|---|---|---|
| r4 = 11.655 | d4 = 0.20 | nd3 = 1.58913 | vd3 = 61.14 |
| r5 = 7.658* | d5 = 3.06 | | |
| r6 = 15.803 | d6 = 3.15 | nd4 = 1.84666 | vd4 = 23.78 |
| r7 = 39.534 | d7 = variable | | |
| r8 = ∞ (AS) | d8 = 0.57 | | |
| r9 = 18.599* | d9 = 1.77 | nd5 = 1.74330 | vd5 = 49.33 |
| r10 = −271.497 | d10 = 0.44 | | |
| r11 = 11.608 | d11 = 3.57 | nd6 = 1.77250 | vd6 = 49.60 |
| r12 = 67.817 | d12 = 2.46 | nd7 = 1.84666 | vd7 = 23.78 |
| r13 = 7.841 | d13 = 0.73 | | |
| r14 = 34.086 | d14 = 3.51 | nd8 = 1.48749 | vd8 = 70.23 |
| r15 = −14.106 | d15 = variable | | |
| r16 = 31.535* | d16 = 1.44 | nd9 = 1.49700 | vd9 = 81.54 |
| r17 = −26.953* | d17 = variable | | |
| r18 = ∞ | d18 = 0.76 | nd10 = 1.54771 | vd10 = 62.84 |
| r19 = ∞ | d19 = 0.44 | | |
| r20 = ∞ | d20 = 0.40 | nd11 = 1.51633 | vd11 = 64.14 |
| r21 = ∞ | d21 = 0.60 | | |
| r22 = ∞ (IS) | | | |

*Aspherical Surface
AS: Aperture Stop
IS: Image Surface

TABLE 14

Aspherical Coefficients

| Surface | K | A4 | A6 | A8 | A10 |
|---|---|---|---|---|---|
| 5 | −0.857 | −7.20658E−5 | −2.65051E−6 | 3.22678E−8 | −2.37139E−10 |
| 9 | −6.350 | 7.34191E−5 | −1.50741E−9 | −7.32193E−8 | 2.84738E−9 |
| 16 | 9.919 | −1.55031E−3 | 2.58262E−4 | −1.81102E−5 | 4.58950E−7 |
| 17 | 3.996 | −1.80199E−3 | 3.74853E−4 | −2.56321E−5 | 6.32924E−7 |

TABLE 15

Zoom Data (∞)

| | WE | ST | TE |
|---|---|---|---|
| f (mm) | 4.030 | 8.621 | 18.388 |
| FNO | 2.80 | 3.67 | 4.80 |

TABLE 15-continued

Zoom Data (∞)

| | WE | ST | TE |
|---|---|---|---|
| d7 | 32.78 | 12.74 | 2.52 |
| d15 | 4.50 | 12.56 | 26.16 |
| d17 | 3.73 | 2.29 | 1.59 |

FIGS. 6A to 10C show aberration diagrams when the zoom lens of Examples 1 to 5 when focused on an infinite object. Among the drawings, FIGS. 6A, 7A, 8A, 9A, and 10A are aberration diagrams of wide angle ends, FIGS. 6B, 7B, 8B, 9B, and 10B are aberration diagrams of intermediate focal length states, FIGS. 6C, 7C, 8C, 9C, and 10C are aberration diagrams of telephoto ends. In each diagram, SA denotes a spherical aberration, AS denotes an astigmatism, DST denotes distortion, and CC denotes a chromatic aberration of magnification. In each diagram, "FIY" denotes an image height.

Next, there are described values of parameters of the above conditions, and values of IH, fw, ft, f1G, f2G, HB1, HD12w, and TLw in the above example.

TABLE 16

| | Examples | | | | |
|---|---|---|---|---|---|
| Parameters | Ex. 1 | Ex. 2 | Ex. 3 | Ex. 4 | Ex. 5 |
| IH/fw | 0.902 | 0.902 | 0.901 | 0.807 | 0.893 |
| ft/fw | 4.558 | 4.583 | 4.504 | 4.097 | 4.563 |
| da/f1G | 2.315 | 2.301 | 2.169 | 2.035 | 2.485 |
| db/f2G | 0.145 | 0.104 | 0.135 | 0.167 | |
| IH/r | 0.0299 | 0.0303 | 0.0008 | 0.0297 | 0.0205 |
| (r21 + r22)/(r21 − r22) | −0.917 | −0.977 | −1.328 | −0.971 | −0.872 |
| IH/HB1 | 0.424 | 0.412 | 0.399 | 0.440 | 0.421 |
| f2G/fw | 3.598 | 3.599 | 3.797 | 3.309 | 3.782 |
| IH/HD12w | 0.104 | 0.103 | 0.098 | 0.106 | 0.086 |
| TLw/fw | 15.57 | 15.58 | 15.56 | 13.78 | 17.37 |
| f1G/fw | 2.899 | 2.912 | 3.191 | 2.899 | 3.273 |
| d12/d11 | 1.092 | 1.061 | 1.053 | 1.007 | 0.843 |
| d13/d11 | 2.229 | 2.29 | 2.189 | 2.056 | 1.831 |
| (d11 + d12 + d13)/dtotal | 1 | 1 | 1 | 1 | 0.969 |
| d11/ID | 0.364 | 0.364 | 0.367 | 0.397 | 0.478 |
| dy1/d11 | 0 | 0 | 0 | 0 | 0.116 |

TABLE 17

| | Example | | | | |
|---|---|---|---|---|---|
| | Ex. 1 | Ex. 2 | Ex. 3 | Ex. 4 | Ex. 5 |
| IH | 3.60 | 3.60 | 3.60 | 3.60 | 3.60 |
| fw | 3.991 | 3.990 | 3.995 | 4.460 | 4.03 |
| ft | 18.189 | 18.288 | 17.995 | 18.274 | 18.388 |
| f1G | −11.57 | −11.62 | −12.75 | −12.93 | −13.19 |
| f2G | 14.36 | 14.36 | 15.17 | 14.76 | 15.24 |
| HB1 | 8.49 | 8.73 | 9.02 | 8.18 | −8.56 |
| HD12w | 34.68 | 35.08 | 36.92 | 34.06 | 41.83 |
| TLw | 62.15 | 62.15 | 62.17 | 61.45 | 70.01 |

Figure 11:
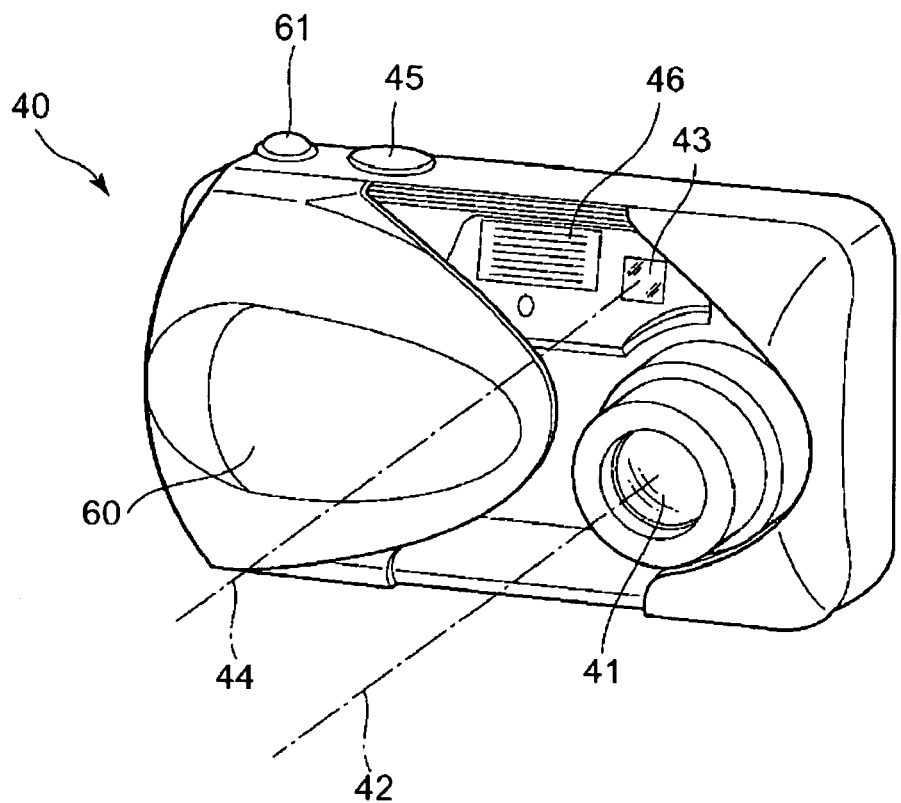
FIG. 11 is a front perspective view showing an appearance of a digital camera of the present invention.
Figure 12:
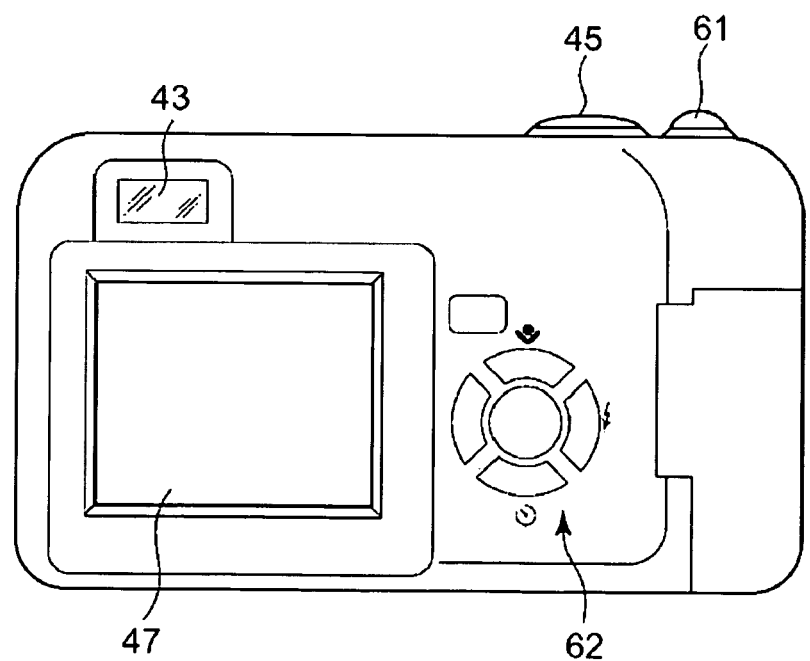
FIG. 12 is a back view of the digital camera of FIG. 11.
Figure 13:
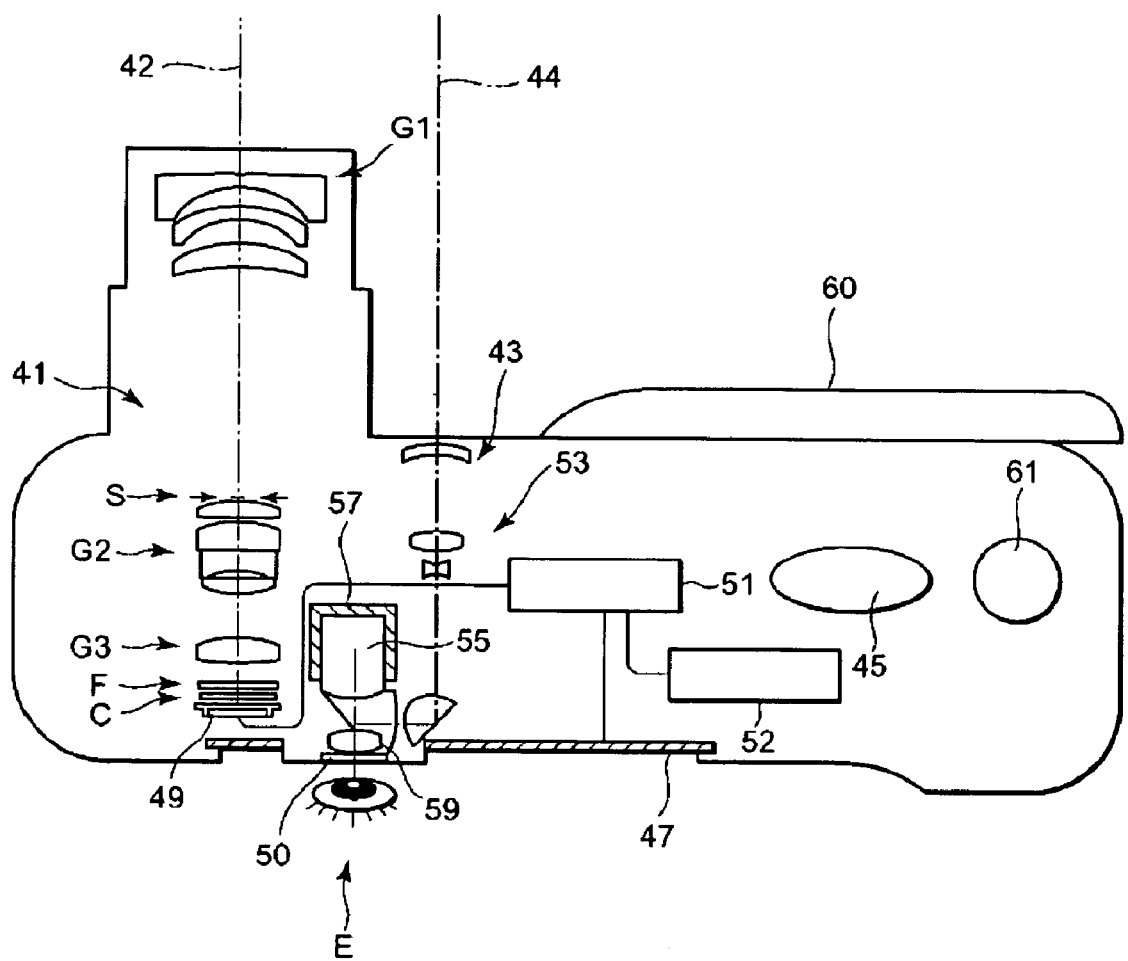
FIG. 13 is an explanatory view showing an inner structure of the digital camera of FIG. 11.

FIGS. 11 to 13 show conceptual diagrams of constitutions of a digital camera in which the above-described zoom lens system is incorporated as a photographing optical system 41. FIG. 11 is a front perspective view showing an appearance of a digital camera 40, FIG. 12 is a back view of the digital camera 40, and FIG. 13 is a schematic sectional view showing an inner constitution of the digital camera 40. In this example, the photographing optical system is of a collapsible type. In FIGS. 11 and 13, the photographing optical system 41 has a non-collapsed state. In this example, the digital camera 40 includes the photographing optical system 41 having an optical path 42 for photographing, a finder optical system 43 having an optical path 44 for a finder, a shutter button 45, a flash 46, a liquid crystal display monitor 47, a focal length change button 61, a setting change switch 62 and the like. In the collapsed state of the photographing optical system 41, when a cover 60 is slid, the photographing optical system 41, the finder optical system 43, and the flash 46 are covered with the cover 60. Moreover, when the cover 60 is opened to bring the digital camera 40 into a photographing state, the photographing optical system 41 becomes a non-collapsed state as shown in FIG. 11. When the shutter button 45 disposed in an upper part of the camera 40 is pressed, the photographing is performed by the photographing optical system 41, for example, the zoom lens system of Example 1. An object image is formed by the photographing optical system 41 on an image pickup surface (photoelectric conversion surface) of a CCD 49 via a low pass filter F coated with a wavelength region restricting coating and a cover glass C. The object image received by the CCD 49 is displayed as an electronic image in the liquid crystal display monitor 47 disposed on the back side of the camera via processing means 51. This processing means 51 is connected to recording means 52, and the photographed image can be electrically recorded. It is to be noted that this recording means 52 may be disposed separately from the processing means 51, and may be constituted to electronically record and reproduce data by use of a floppy disk, a memory card, a magneto-optical disc or the like. The camera may be constituted as a silver salt camera in which a silver salt film is disposed instead of the CCD 49.

Furthermore, an objective optical system 53 for the finder is disposed along the optical path 44 for the finder. The objective optical system 53 for the finder includes a plurality of lens units (three lens units in the drawing) and two prisms, and a zoom optical system whose focal length changes in conjunction with the zoom lens system of the photographing optical system 41. The object image is formed by the objective optical system 53 for this finder on a view field frame 57 of an image erecting prism 55. An eyepiece optical system 59 which introduces a formed erected image into observer's eyeball E is disposed behind the image erecting prism 55. It is to be noted that a cover member 50 is disposed on an emission side of the eyepiece optical system 59.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
   a first lens unit having a negative refractive power;
   a second lens unit having a positive refractive power; and
   a third lens unit having a positive refractive power,
   spaces between the respective lens units being changed during zooming,
   the zoom lens system satisfying the following conditions (1A) through (4A):

$0.80 < IH/fw < 1.5$ (1A);

$2.7 < ft/fw < 12$ (2A);

$$0.05 < |da/f1G| < 10 \quad (3A); \text{ and}$$

$$0 < db/f2G < 3 \quad (4A),$$

wherein IH is an image height of the zoom lens system,
fw is a focal length in a wide angle end of the zoom lens system,
ft is a focal length in a telephoto end of the zoom lens system,
f1G is a focal length of the first lens unit,
f2G is a focal length of the second lens unit,
da is an axial space between the first lens unit and the second lens unit at a time when a focal length fra of the zoom lens system has any value that satisfies the following condition (a):

$$IH/0.92 < fra < IH/0.8 \quad (a), \text{ and}$$

db is an axial space between the first lens unit and the second lens unit at a time when a focal length frb of the zoom lens system has any value that satisfies the following condition (b):

$$2.7 < frb/fra < 5 \quad (b).$$

2. The zoom lens system according to claim 1, satisfying the following condition (5A):

$$-0.07 < IH/r1 < 0.07 \quad (5A),$$

wherein r1 is a paraxial radius of curvature of a lens surface closest to the object side in the first lens unit.

3. The zoom lens system according to claim 2, satisfying the following condition (5A'):

$$-0.015 < IH/r1 < 0.04 \quad (5A').$$

4. The zoom lens system according to claim 1, further comprising an aperture stop,
wherein, during the zooming from the wide angle end to the telephoto end, the first lens unit moves, and the second lens unit moves toward the object side and the aperture stop moves together with the second lens unit.

5. The zoom lens system according to claim 4, wherein the aperture stop is disposed between the first lens unit and the second lens unit.

6. The zoom lens system according to claim 1, wherein the zoom lens system is a three-unit zoom lens system including, as lens units having refractive powers, only three lens units of: the first lens unit having the negative refractive power; the second lens unit having the positive refractive power; and the third lens unit having the positive refractive power in order from the object side.

7. The zoom lens system according to claim 1, wherein the first lens unit comprises a lens L11 arranged closest to the object side therein, and
the lens L11 is a negative meniscus lens which directs its convex surface on the object side.

8. The zoom lens system according to claim 1, wherein the first lens unit comprises, in order from the object side:
a negative lens; and
a negative meniscus lens which is disposed on the image side of the negative lens with an axial air space from the negative lens and which directs its convex surface on the object side.

9. The zoom lens system according to claim 1, wherein the first lens unit comprises a negative lens having an aspherical surface.

10. The zoom lens system according to claim 1, wherein the first lens unit comprises, in order from the object side:
a negative lens; and
a negative lens which is disposed on the image side of the negative lens with an axial air space from the negative lens, and
the negative lens disposed on the image side has an aspherical surface.

11. The zoom lens system according to claim 10, wherein the negative lens disposed on the image side has two aspherical surfaces.

12. The zoom lens system according to claim 1, wherein the first lens unit consists of, in order from the object side:
three lens elements of a negative lens L11, a negative lens L12, and a positive lens L13.

13. The zoom lens system according to claim 1, wherein the third lens unit consists of one positive lens.

14. The zoom lens system according to claim 1, wherein the third lens unit comprises a positive lens having at least an aspherical surface.

15. The zoom lens system according to claim 1, wherein the second lens unit comprises, in order to from the object side:
a positive lens component; a negative lens component; and a positive lens component,
wherein a lens component is defined as a single lens element or a cemented lens.

16. The zoom lens system according to claim 1, wherein the second lens unit comprises: a positive lens component arranged closest to the object side therein, the positive lens component satisfying the following condition (6A):

$$-8 < (r21+r22)/(r21-r22) < 0 \quad (6A),$$

wherein r21 denotes a paraxial radius of curvature of the object-side surface of the positive lens component, r22 denotes a paraxial radius of curvature of the image-side surface of the positive lens component and a lens component is defined as a single lens element or a cemented lens.

17. The zoom lens system according to claim 16, satisfying the following condition (6A'):

$$-2 < (r21+r22)/(r21-r22) < -0.5 \quad (6A').$$

18. The zoom lens system according to claim 1, wherein the lens surface closest to the object side in the second lens unit is an aspherical surface.

19. The zoom lens system according to claim 15, wherein the second lens unit consists of, in order from the object side:
a single lens element having a positive refractive power;
a cemented lens consisting of a positive lens element and a negative lens element; and a single lens element having a positive refractive power.

20. An electronic image pickup apparatus comprising:
a zoom lens system according to claim 1; and
an electronic image sensor which is disposed on an image side of the zoom lens system and which converts an optical image into an electric signal.

21. A zoom lens system comprises, in order from an object side:
a first lens unit having a negative refractive power;
a second lens unit having a positive refractive power; and
a third lens unit having a positive refractive power,
zooming in excess of two-fold being performed by changing spaces between the respective lens units,
the zoom lens system satisfying the following condition (1B),
wherein the first lens unit includes: a negative lens L11 in which an absolute value of a curvature of an image-side surface is larger than that of a curvature of an object-side surface; and two lenses L12, L13 arranged on the image side of the negative lens L11, and the only lenses L11, L12, and L13 among the lenses included in the first lens unit satisfy the following condition (4B), and further satisfy the following conditions (2B), (3B) and (5B):

$$0.76 < IH/fw < 1.5 \quad (1B);$$

$$0.05 < |da/f1G| < 10 \quad (2B);$$

$$IH/HB1 < 0.5 \quad (3B);$$

$$0.5 < dx/d11 < 4 \quad (4B); \text{ and}$$

$$0.80 < (d11+d12+d13)/d\text{total} < 1.00 \quad (5B),$$

wherein IH is an image height of the zoom lens system,
fw is a focal length in a wide angle end of the zoom lens system,
f1G is a focal length of the first lens unit,
HB1 is a distance from a vertex of an image-side lens surface to a rear principal point of the first lens unit, and indicates a positive value in a case where the distance is measured in a direction toward the object,
d11 is an axial thickness of the negative lens L11,
d12 is an axial thickness of the lens L12,
d13 is an axial thickness of the lens L13,
dx is an axial thickness of each lens L1x (x=1, 2, ... ) in the first lens unit,
dtotal is a sum of axial thicknesses of the lenses in the first lens unit, and
da is an axial space between the first lens unit and the second lens unit at a time when a focal length fra of the zoom lens system has any value that satisfies the following condition (c):

$$IH/0.92 < fra < IH/0.76 \quad (c).$$

22. The zoom lens system according to claim 21, satisfying the following condition (3B'):

$$0.2 < IH/HB1 < 0.5 \quad (3B').$$

23. The zoom lens system according to claim 21, satisfying the following condition (6B):

$$0.2 < d11/IH < 1 \quad (6B).$$

24. The zoom lens system according to claim 21, wherein the lens L12 is a negative meniscus lens which is disposed on the image side of the negative lens L11 with an axial air space from the negative lens L11 and which directs its convex surface on the object side, and
the lens L13 is a positive lens which is disposed on the image side of the lens L12 with an axial air space from the lens L12.

25. The zoom lens system according to claim 24, wherein the first lens unit consists of, in order from the object side, the negative lens L11, the negative meniscus lens L12, and the positive lens L13.

26. The zoom lens system according to claim 21, wherein the first lens unit comprises a lens Ly1, and
the lens Ly1 is a lens different from the negative lens L11, the lens L12, and the lens L13, and satisfies the following condition (7B):

$$0 < dy1/d11 < 0.5 \quad (7B),$$

wherein dy1 denotes an axial thickness of the lens Ly1.

27. The zoom lens system according to claim 26, satisfying the following condition (7B'), $$0.05 < dy1/d11 < 0.2 \quad (7B').$$

28. The zoom lens system according to claim 26, wherein the lens L12 is a negative meniscus lens which is disposed on the image side of the negative lens L11 with an axial air space from the negative lens L11 and which directs its convex surface on the object side,
the lens L13 is a positive lens which is disposed on the image side of the lens L12 with an axial air space from the lens L12, and
the lens Ly1 is a negative lens disposed on the image side of the lens L12.

29. The zoom lens system according to claim 21, wherein the negative lens L11 is a negative meniscus lens which is disposed closest to the object side in the first lens unit and which directs its convex surface on the object side.

30. The zoom lens system according to claim 21, wherein at least one lens of the first lens unit is a negative lens having an aspherical surface.

31. The zoom lens system according to claim 30, wherein the negative lens L12 has two aspherical surfaces.

32. The zoom lens system according to claim 21, further comprising an aperture stop which moves together with the second lens unit during zooming;
wherein, during the zooming from the wide angle end to the telephoto end, the first lens unit moves, and the second lens unit moves toward the object side.

33. The zoom lens system according to claim 32, wherein the aperture stop is disposed between the first lens unit and the second lens unit.

34. The zoom lens system according to claim 21, wherein the zoom lens system is a three-unit zoom lens system including, as lens units having refractive powers, only three lens units of: the first lens unit having the negative refractive power; the second lens unit having the positive refractive power; and the third lens unit having the positive refractive power in order from the object side.

35. The zoom lens system according to claim 21, wherein the third lens unit consists of a positive lens.

36. The zoom lens system according to claim 21, wherein the third lens unit comprises a positive lens having at least an aspherical surface.

37. The zoom lens system according to claim 21, wherein the second lens unit comprises, in order from the object side,
a positive lens component, a negative lens component, and a positive lens component, and
wherein a lens component is defined as a single lens element or a cemented lens.

38. The zoom lens system according to claim 21, wherein the second lens unit has a positive lens component arranged closest to the object side therein, and the positive lens component satisfies the following condition (8B):

$$-8 < (r21+r22)/(r21-r22) < 0 \quad (8B),$$

wherein
r21 denotes a paraxial radius of curvature of the object-side surface of the positive lens component,
r22 denotes a paraxial radius of curvature of the image-side surface of the positive lens component, and
a lens component is defined as a single lens element or a cemented lens.

39. The zoom lens system according to claim 38, satisfying the following condition (8B'):

$$-2 < (r21+r22)/(r21-r22) < -0.5 \quad (8B),$$

40. The zoom lens system according to claim 21, wherein the lens surface closest to the object side in the second lens unit is an aspherical surface.

41. The zoom lens system according to claim 37, wherein the second lens unit consists of, in order from the object side, a single lens element having a positive refractive power,
a cemented lens of positive and negative lenses, and a
single lens element having a positive refractive power.

42. The zoom lens system according to claim 38, wherein the second lens unit consists of, in order from the object side,
a single lens element having a positive refractive power,
a cemented lens of positive and negative lenses, and a
single lens element having a positive refractive power.

43. The zoom lens system according to claim 40, wherein the second lens unit consists of, in order from the object side,
a single lens element having a positive refractive power,
a cemented lens of positive and negative lenses, and a
single lens element having a positive refractive power.

44. An electronic image pickup apparatus comprising:
a zoom lens system according to claim 21; and
an electronic image sensor which is disposed on an image side of the zoom lens system and which converts an optical image into an electric signal.

* * * * *